US012712900B2

(12) United States Patent
Peled et al.

(10) Patent No.: US 12,712,900 B2
(45) Date of Patent: Aug. 18, 2026

(54) SYSTEM AND METHOD FOR DETECTING ANOMALIES WITHIN A DOMAIN NAME SYSTEM (DNS) TRAFFIC

(71) Applicant: Honeywell International Inc., Charlotte, NC (US)

(72) Inventors: Niv Peled, Even Yehuda (IL); Alex Zelichenko, Kochav Yair (IL); Paz Fichman, Tel aviv (IL); Adam Engelhart, Bruchin (IL)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 230 days.

(21) Appl. No.: 18/755,737

(22) Filed: Jun. 27, 2024

(65) Prior Publication Data

US 2026/0006049 A1 Jan. 1, 2026

(51) Int. Cl.
*G06N 20/00* (2019.01)
*H04L 9/40* (2022.01)
*H04L 61/4511* (2022.01)

(52) U.S. Cl.
CPC ................................ *H04L 63/1425* (2013.01)

(58) Field of Classification Search
None
See application file for complete search history.

(56) References Cited

U.S. PATENT DOCUMENTS

2015/0263903 A1* 9/2015 Thomas ............. G06Q 30/0273 709/224
2015/0312154 A1* 10/2015 Beevers .............. H04L 61/4511 709/223
2017/0041333 A1* 2/2017 Mahjoub ............. H04L 43/0876
2020/0137094 A1* 4/2020 Janakiraman .......... G06N 20/00
2020/0195669 A1* 6/2020 Karasaridis ............. H04L 63/10
2021/0119923 A1* 4/2021 Brown .................... H04L 47/80
2022/0385673 A1* 12/2022 Dong .................. H04L 63/1425
2023/0261957 A1* 8/2023 Gustavsson ........... H04L 41/145 370/241

* cited by examiner

*Primary Examiner* — Christopher B Robinson
(74) *Attorney, Agent, or Firm* — Alston & Bird LLP

(57) ABSTRACT

A method and system for detecting anomalies within a domain name system (DNS) traffic is disclosed. Through the utilization of at least one processor, the method comprises receiving DNS traffic data from each of one or more DNS servers in real time, comparing the DNS traffic data with a data stored in a database. Furthermore, the method comprises determining a status of each of one or more DNS servers based on comparison. Further, the method comprises generating an alert for one or more users, based at least on the status. Furthermore, the method comprises determining whether each of one or more DNS servers outside a predefined learning period is queried by one or more DNS hosts. Thereafter, the method comprises adding each of one or more DNS servers to a baseline database upon determining that each of one or more DNS servers outside the predefined learning period is queried.

20 Claims, 16 Drawing Sheets

502 504 506 508

| ALERT | DESCRIPTION | LEARNING TIME | VALUE |
| --- | --- | --- | --- |
| NEW DNS SERVER DETECTED | RAISED WHEN A NEW DNS SERVER IS FOUND AFTER LEARNING MODE | 1 WEEK | NOTIFIES THE USER ON POTENTIAL BREACH. PROVIDES VISIBILITY OF DNS BEHAVIOR IN THE NETWORK. |
| INACTIVE DNS SERVER | RAISED WHEN THE SERVER WENT SILENT IN PORT 53 | 1 WEEK | NOTIFIES THE USER ON POSSIBLE FAULT IN THE NETWORK PROVIDES VISIBILITY OF DNS BEHAVIOR IN THE NETWORK. |

FIG. 5

SYSTEM AND METHOD FOR DETECTING ANOMALIES WITHIN A DOMAIN NAME SYSTEM (DNS) TRAFFIC

TECHNOLOGICAL FIELD

The present invention relates to cybersecurity systems, and more particularly relates to a system and method for detecting anomalies within a domain name system (DNS) traffic.

BACKGROUND

In the realm of cybersecurity, Intrusion Detection Systems (IDS) serve as vigilant guardians, tirelessly monitoring network activities to sniff out potential threats and breaches. The IDS encounters a complexity in effectively discerning anomalies within a Domain Name System (DNS) traffic. In the DNS traffic, an internet's address book, facilitates the translation of human-readable domain names into machine-readable IP addresses, crucial for navigating a vast digital landscape. The complexity arises from the formidable task of distinguishing between regular DNS activity from strange DNS activity or risky DNS activity in the DNS traffic, especially because DNS activity may differ a lot from one network to another network. The IDS often struggle to adapt to the patterns of each network, that leads to poor accuracy in anomaly detection within the DNS traffic. Consequently, security teams miss real threats or mistakenly flag harmless actions, resulting in compromised network integrity, increased vulnerability of networks to cyber threats, and comprising sensitive data.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In one example embodiment, a method is disclosed. The method comprises receiving, via at least one processor, domain name system (DNS) traffic data from each of one or more DNS servers in real time. The DNS traffic data comprises DNS queries and responses, internet protocol (IP) address of each of the one or more DNS servers, first seen date when each of the one or more DNS servers was first observed, last seen date when each of the one or more DNS servers was last observed, baseline information of each of the one or more DNS servers, or one or more client IP addresses interacted with each of the one or more DNS servers. Further, the method comprises comparing, via the at least one processor, the received DNS traffic data from each of the one or more DNS servers with a data stored in a database. The data corresponds to historical DNS traffic data related to one or more known DNS servers stored in the database during a predefined learning period. Further, the method comprises determining, via the at least one processor, a status of each of the one or more DNS servers based at least on the comparison. The status corresponds to a detection of the one or more DNS servers within the predefined learning period or the detection of the one or more DNS servers outside the predefined learning period. Further, the method comprises generating, via the at least one processor, an alert for one or more users upon determining the one or more DNS servers outside the predefined learning period based at least on the determined status. Further, the method comprises determining, via the at least one processor, whether each of the one or more DNS servers outside the predefined learning period is queried by one or more DNS hosts. Thereafter, the method comprises adding, via the at least one processor, each of the one or more DNS servers to a baseline database upon determining that each of the one or more DNS servers outside the predefined learning period is queried by the one or more DNS hosts.

In some embodiments, the historical DNS traffic data comprises DNS raw data and DNS servers data. The DNS raw data comprises one or more DNS queries and one or more DNS responses. The one or more DNS responses comprises a list of questions that are answered by the one or more DNS servers based at least on the one or more DNS queries.

In some embodiments, the predefined learning period corresponds to a predefined timeframe during which the at least one processor is configured to process and store statistics based on the DNS traffic data into the database. The predefined learning period comprises at least one of hours, days, months, quarters, or years.

In some embodiments, the baseline database comprises one or more baseline parameters. The one or more baseline parameters comprises at least one of learning mode indicating if the database is currently in the predefined learning period, cumulative learning time spent in the predefined learning period, last queried date when the baseline database was queried or updated, last start time when the predefined learning period was started for the baseline database, and a type or a category of a baseline.

In some embodiments, the method further comprising generating, via the at least one processor, a union of the one or more DNS servers and the one or more known DNS servers, upon determining that the one or more DNS servers are within the predefined learning period.

In some embodiments, the method further comprising determining, via the at least one processor, another one or more DNS servers within the union generated. Further, the method comprising determining, via the at least one processor, whether one or more parameters of the another one or more DNS servers within the union are newer than one or more parameters of the one or more known DNS servers upon determining the another one or more DNS servers are within the union. The one or more parameters of the another one or more DNS servers and the one or more parameters of the one or more known DNS servers comprise at least last seen date. Thereafter, the method comprising updating, via the at least one processor, the one or more parameters of the another one or more DNS servers within the database upon determining the one or more parameters of the another one or more DNS servers within the union are newer than one or more parameters of the one or more known DNS servers.

In some embodiments, the method further comprising determining, via the at least one processor, the one or more parameters of the another one or more DNS servers are older than a predefined period. The predefined period corresponds to a forgetting period that corresponds to a time period after which the at least one processor is configured to remove the another one or more DNS servers from the database.

In some embodiments, the method further comprising removing, via the at least one processor, a data associated with each of the another one or more DNS servers upon determining the one or more parameters of the another one or more DNS servers are older than the predefined period.

In some embodiments, the method further comprising displaying, via the at least one processor, the alert on a display device of the one or more users. The alert comprises at least one of alert type that comprises active servers or inactive servers, description of alert, and resolution of the alert.

In another example embodiment, a system is disclosed. The system comprises a memory and at least one processor communicatively coupled to the memory. The at least one processor is configured to receive domain name system (DNS) traffic data from each of one or more DNS servers in real time. The DNS traffic data comprises DNS queries and responses, internet protocol (IP) address of each of the one or more DNS servers, first seen date when each of the one or more DNS servers was first observed, last seen date when each of the one or more DNS servers was last observed, baseline information of each of the one or more DNS servers, or one or more client IP addresses interacted with each of the one or more DNS servers. Further, the at least one processor is configured to compare the received DNS traffic data from each of the one or more DNS servers with a data stored in a database. The data corresponds to historical DNS traffic data related to one or more known DNS servers stored in the database during a predefined learning period. Further, the at least one processor is configured to determine a status of each of the one or more DNS servers based at least on the comparison. The status corresponds to a detection of the one or more DNS servers within the predefined learning period or the detection of the one or more DNS servers outside the predefined learning period. Further, the at least one processor is configured to generate an alert for one or more users upon determining the one or more DNS servers outside the predefined learning period based at least on the determined status. Further, the at least one processor is configured to determine whether each of the one or more DNS servers outside the predefined learning period is queried by one or more DNS hosts. Thereafter, the at least one processor is configured to add each of the one or more DNS servers to a baseline database upon determining that each of the one or more DNS servers outside the predefined learning period is queried by the one or more DNS hosts.

In another example embodiment, a non-transitory machine-readable information storage medium is disclosed. The non-transitory machine-readable information storage medium comprising one or more instructions which when executed by at least one processor cause the at least one processor to receive domain name system (DNS) traffic data from each of one or more DNS servers in real time, wherein the DNS traffic data comprises DNS queries and responses, internet protocol (IP) address of each of the one or more DNS servers, first seen date when each of the one or more DNS servers was first observed, last seen date when each of the one or more DNS servers was last observed, baseline information of each of the one or more DNS servers, or one or more client IP addresses interacted with each of the one or more DNS servers; compare the received DNS traffic data from each of the one or more DNS servers with a data stored in a database, wherein the data corresponds to historical DNS traffic data related to one or more known DNS servers stored in the database during a predefined learning period; determine a status of each of the one or more DNS servers based at least on the comparison, wherein the status corresponds to a detection of the one or more DNS servers within the predefined learning period or the detection of the one or more DNS servers outside the predefined learning period; generate an alert for one or more users upon determining the one or more DNS servers outside the predefined learning period based at least on the determined status; determine whether each of the one or more DNS servers outside the predefined learning period is queried by one or more DNS hosts; and add each of the one or more DNS servers to a baseline database upon determining that each of the one or more DNS servers outside the predefined learning period is queried by the one or more DNS hosts.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
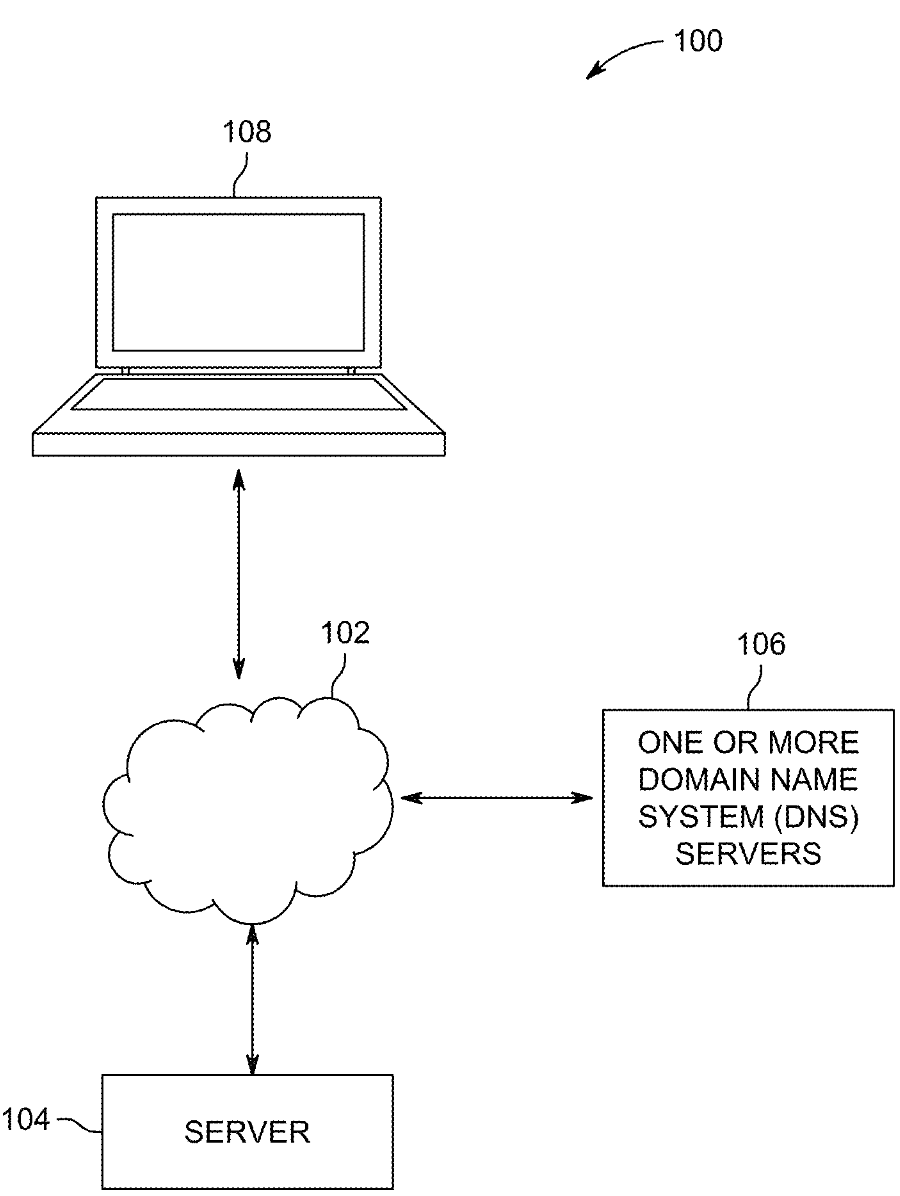
Figure 2:
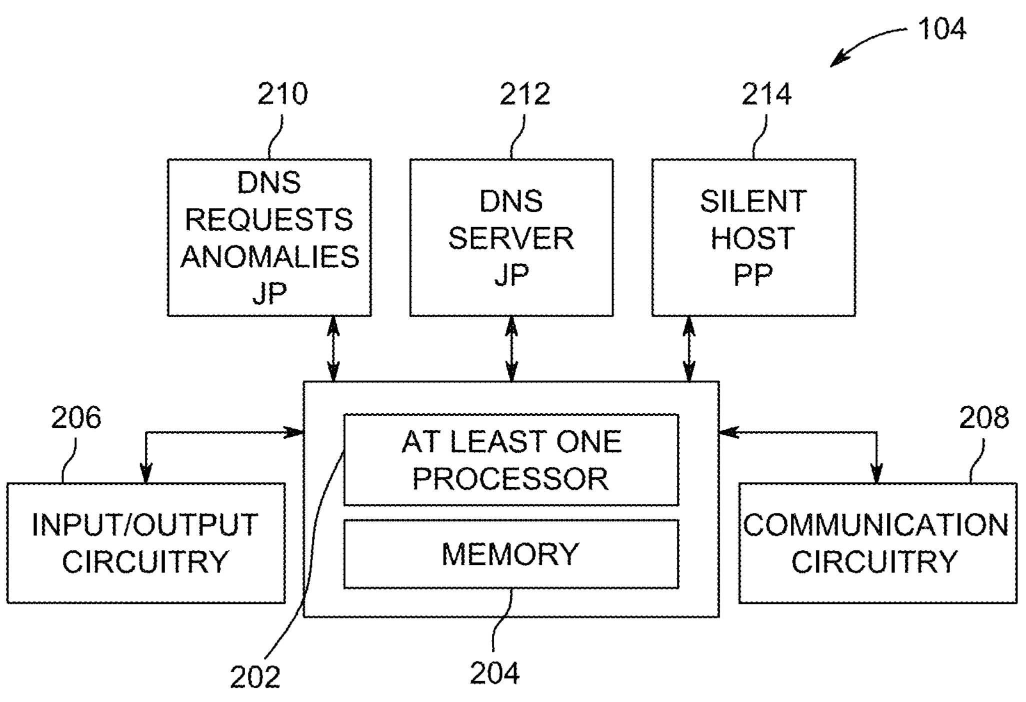
Figure 3:
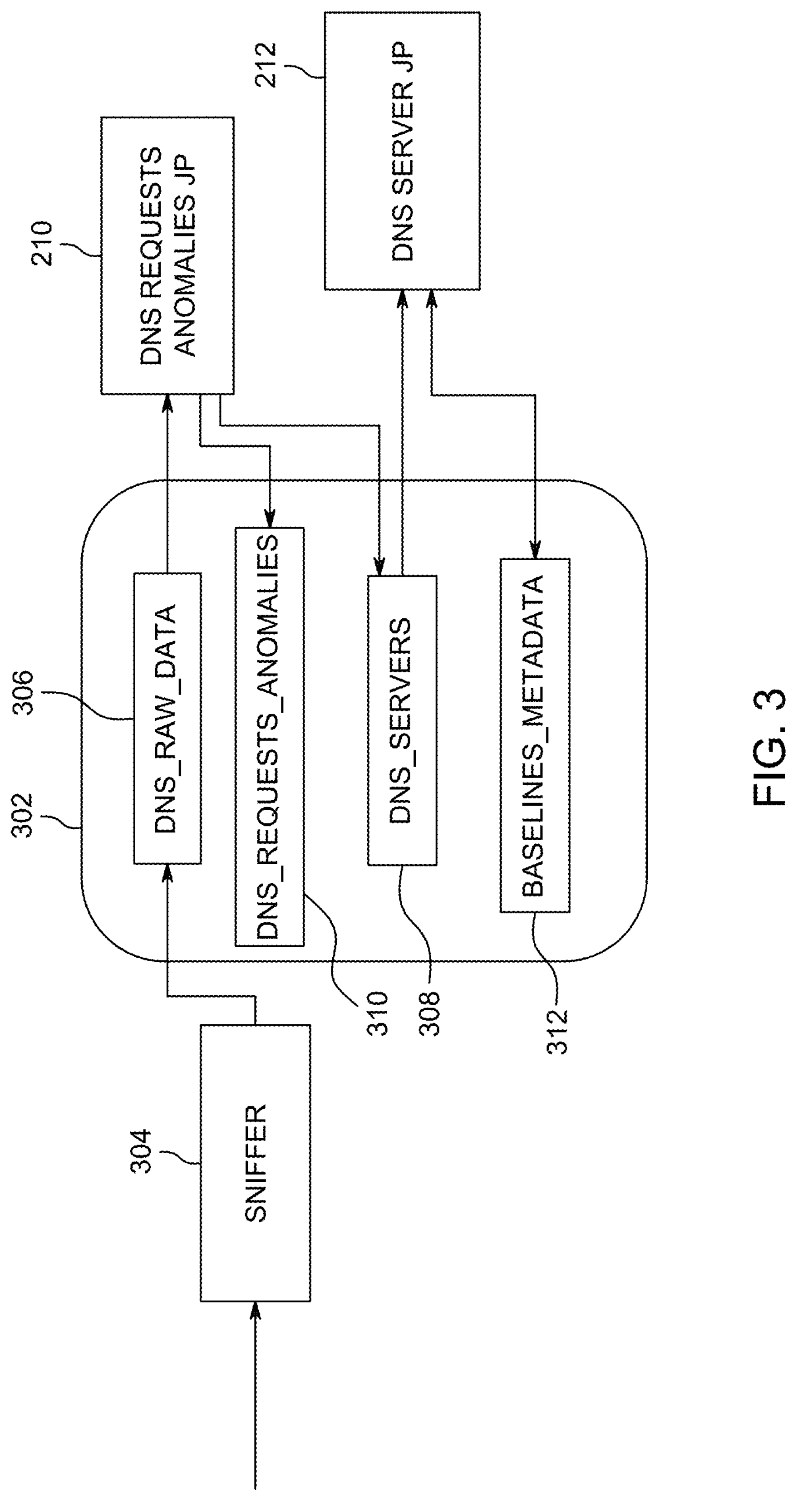
Figure 4:
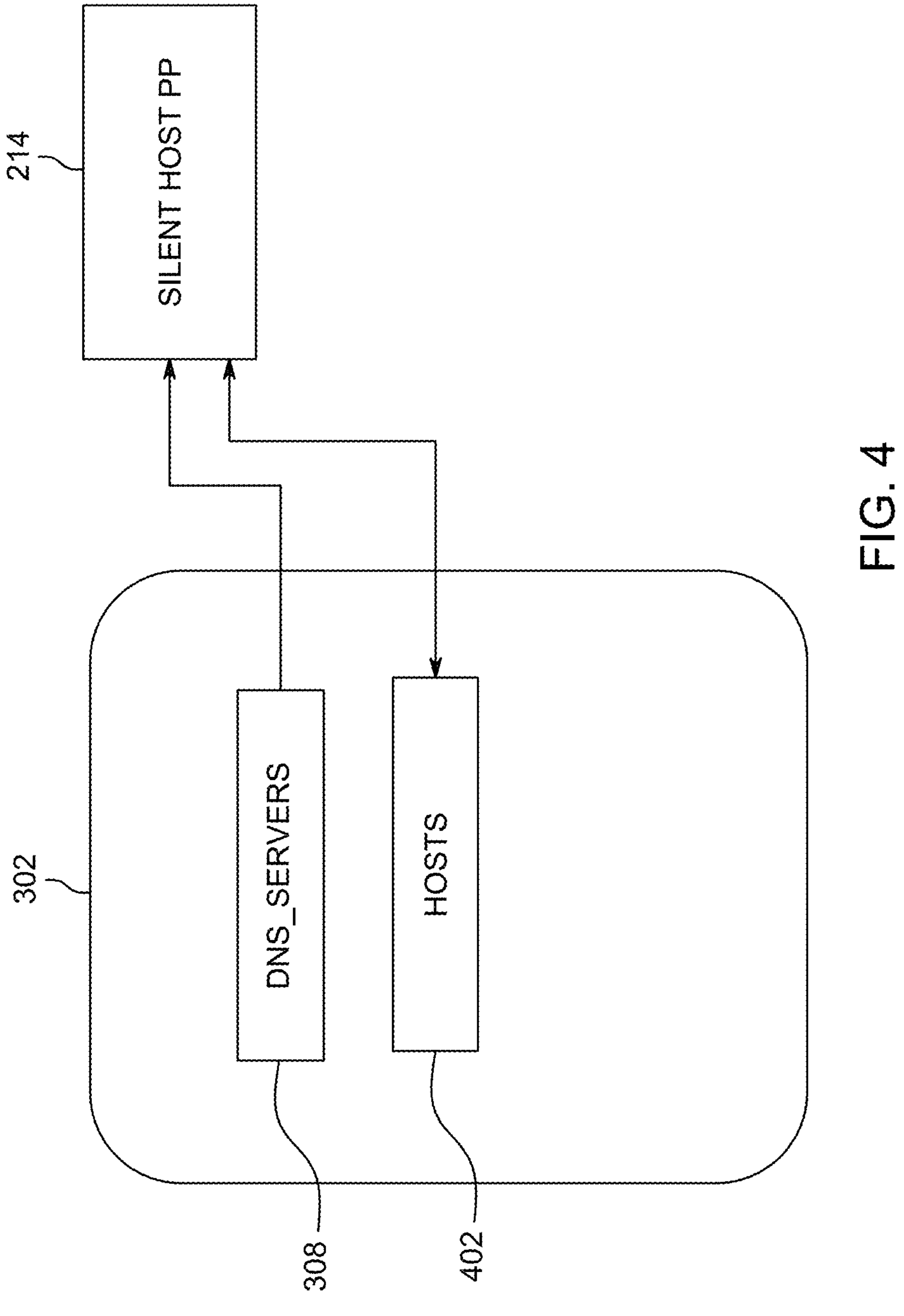
Figure 6:
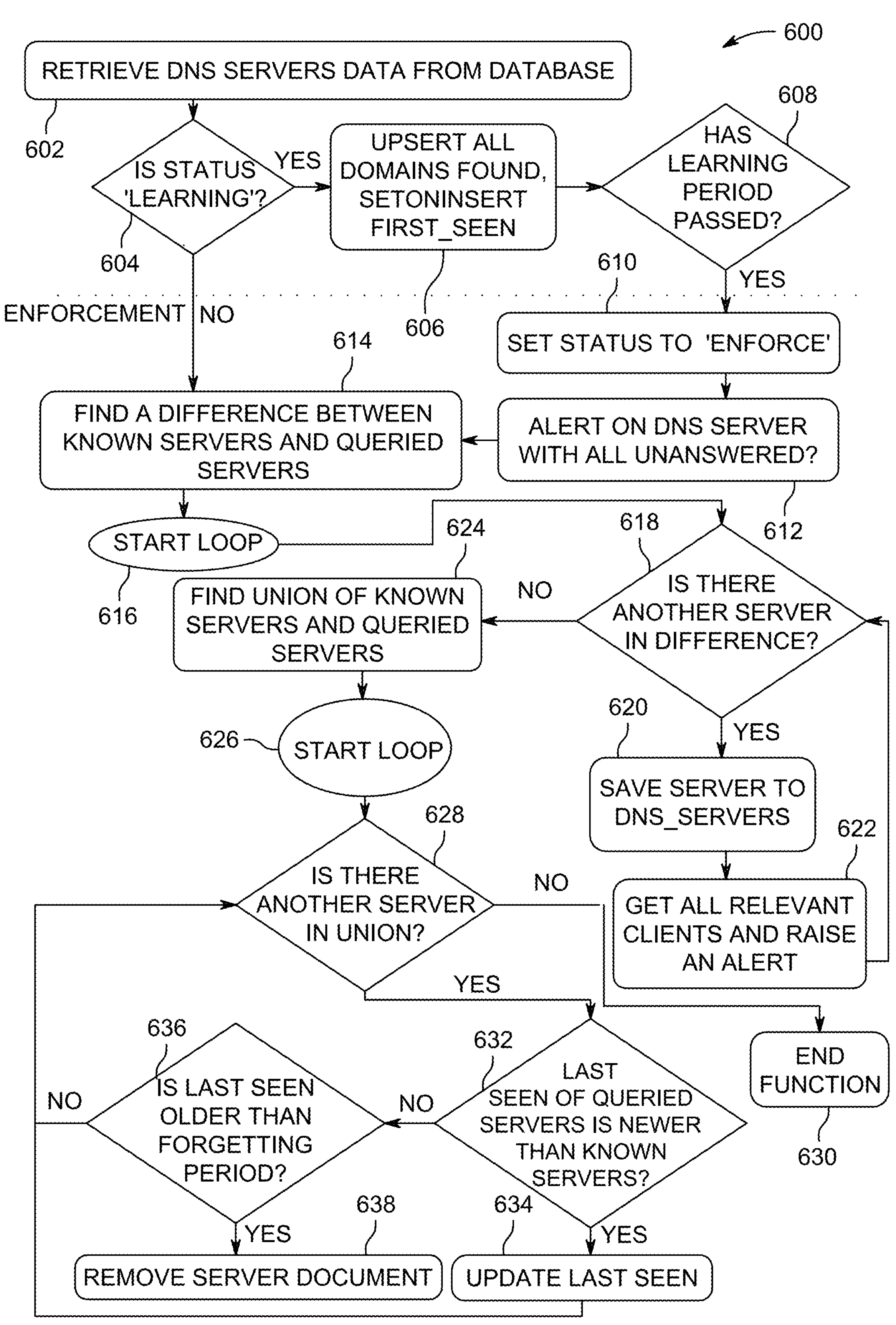
Figure 7:
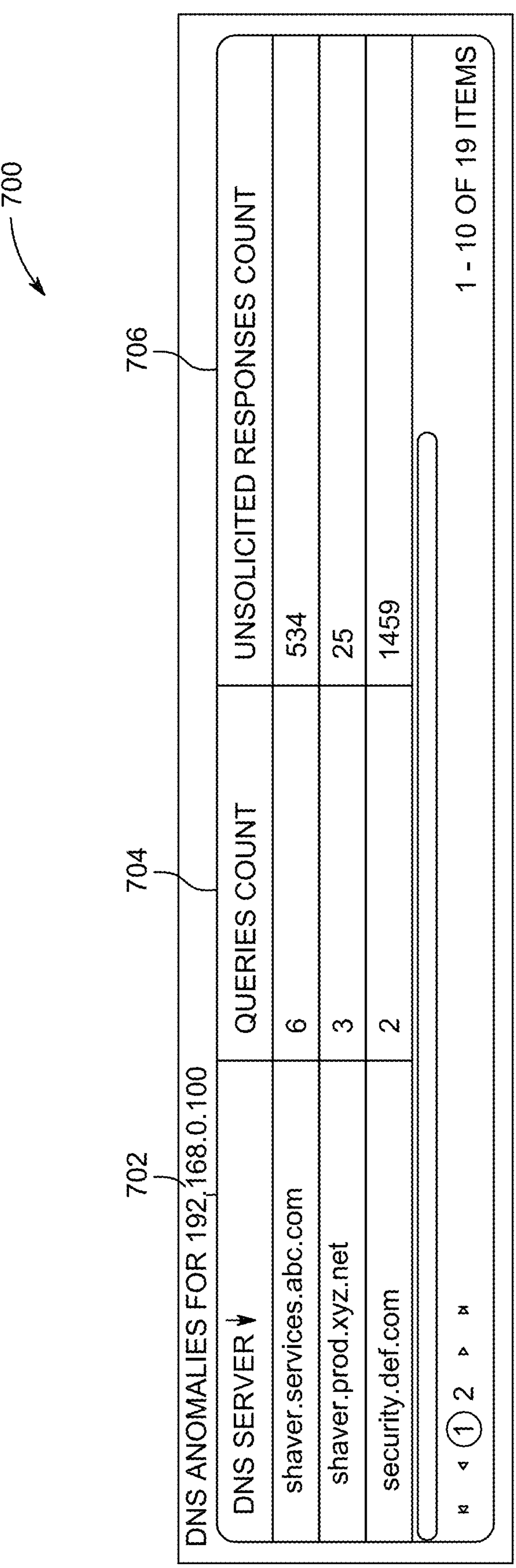
Figure 8:
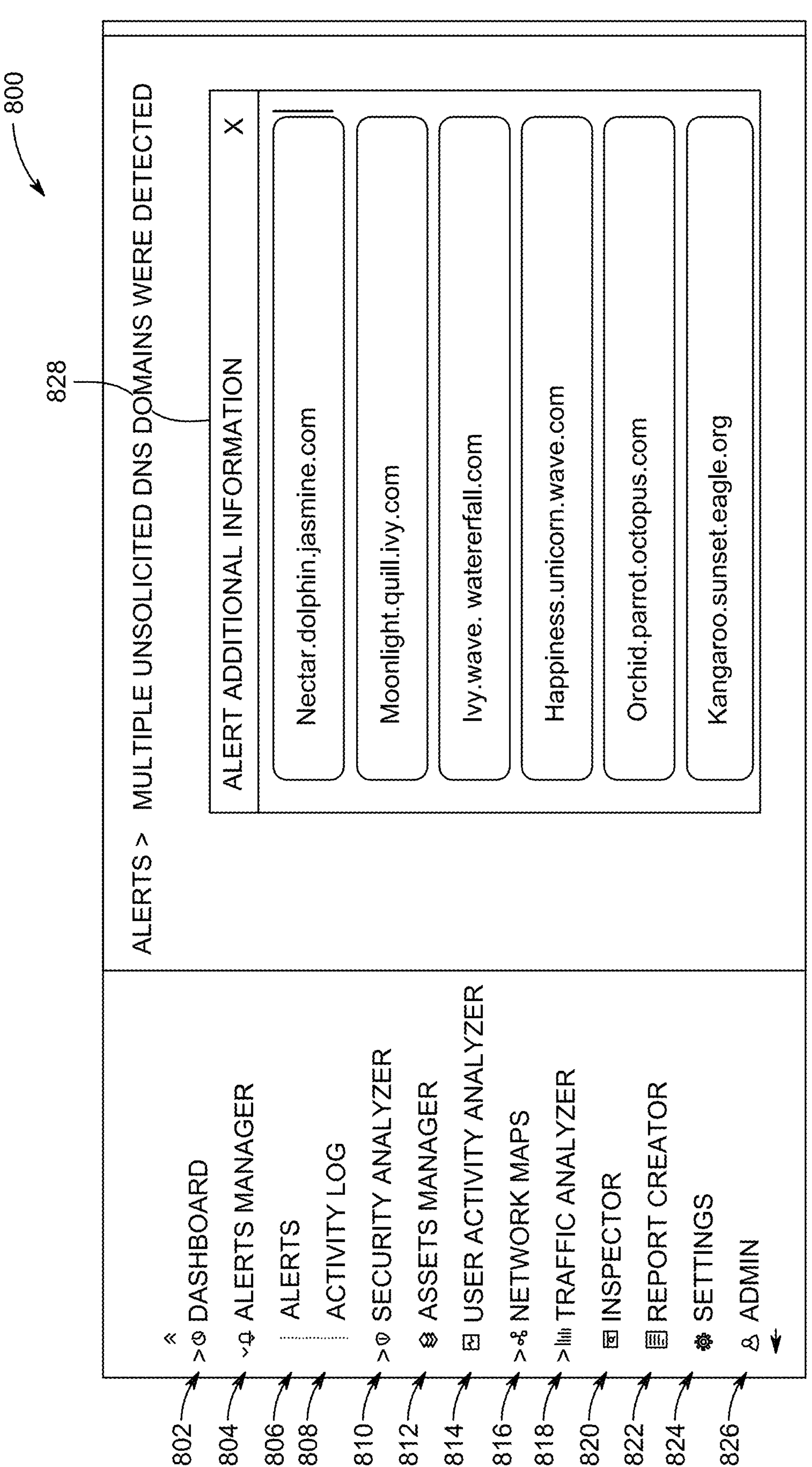
Figure 9:
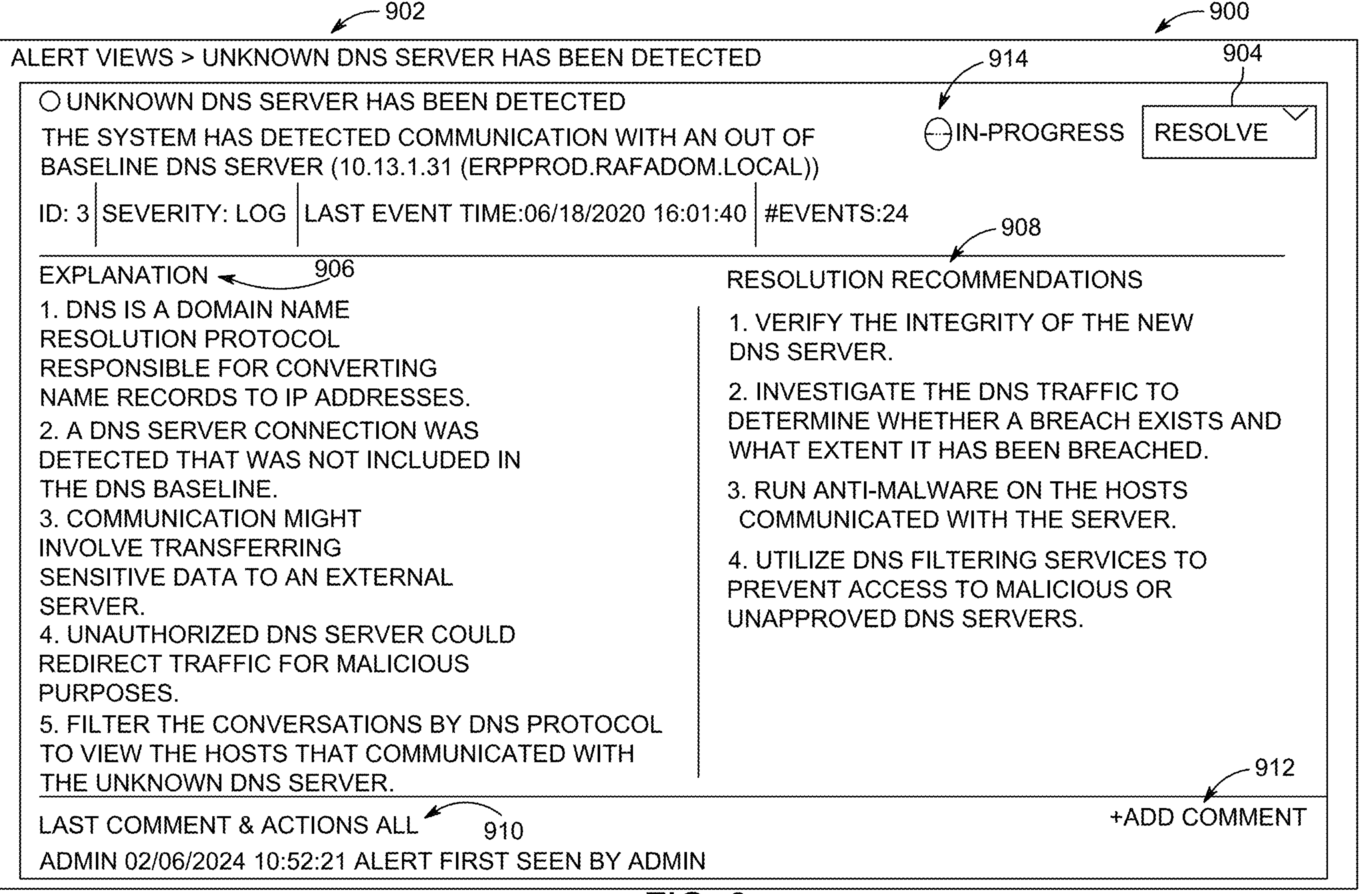
Figure 10:
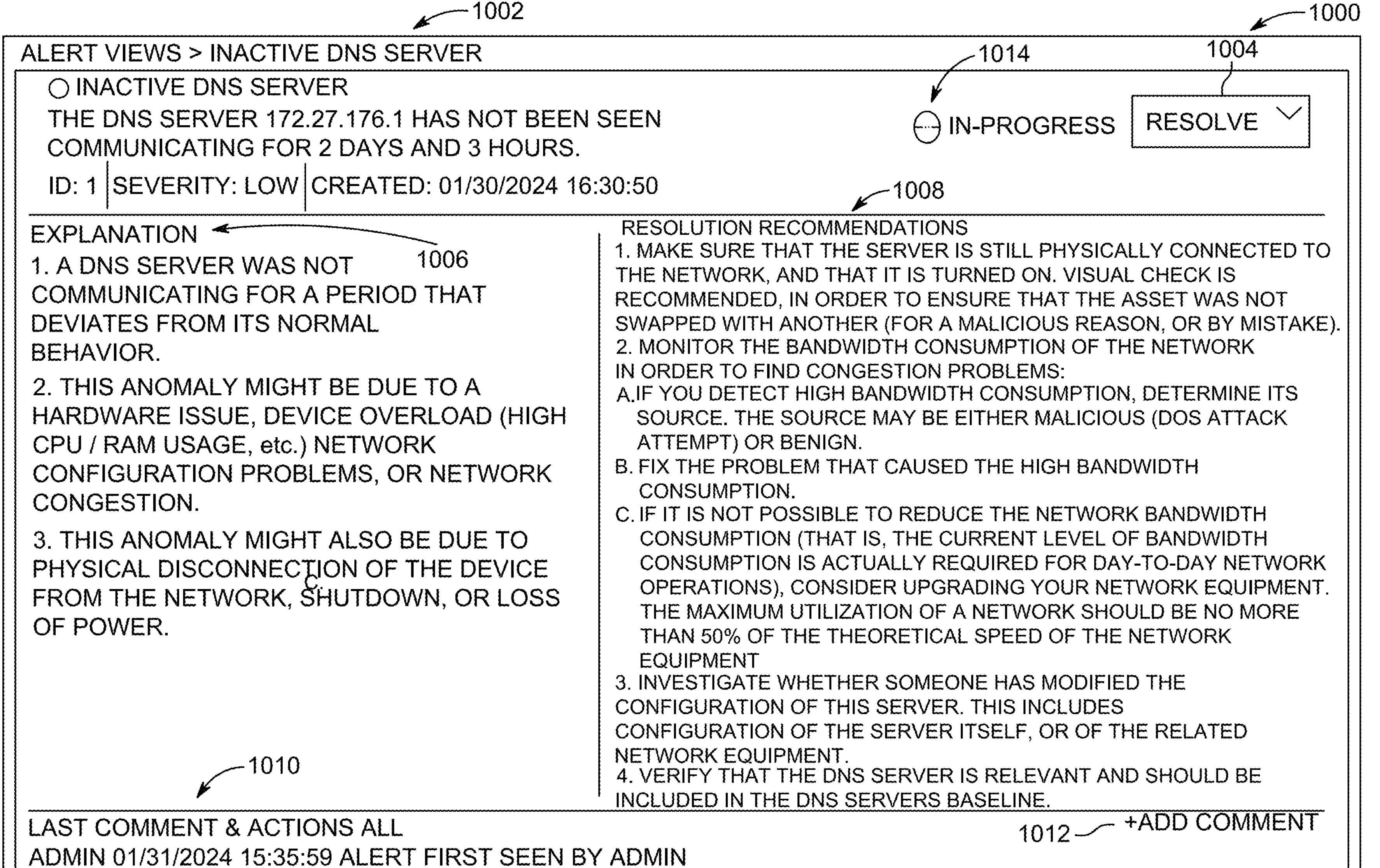
Figure 11:
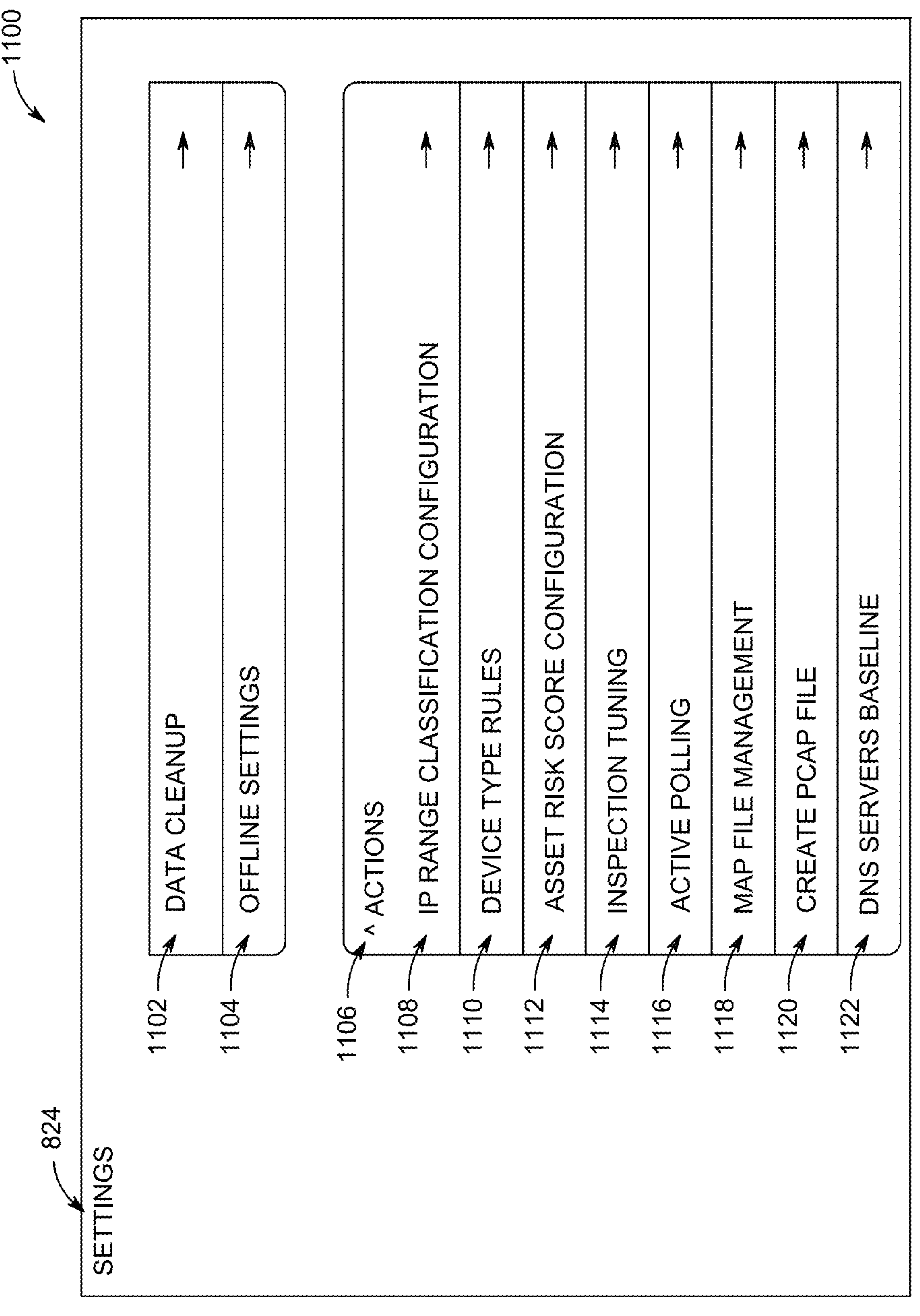
Figure 12:
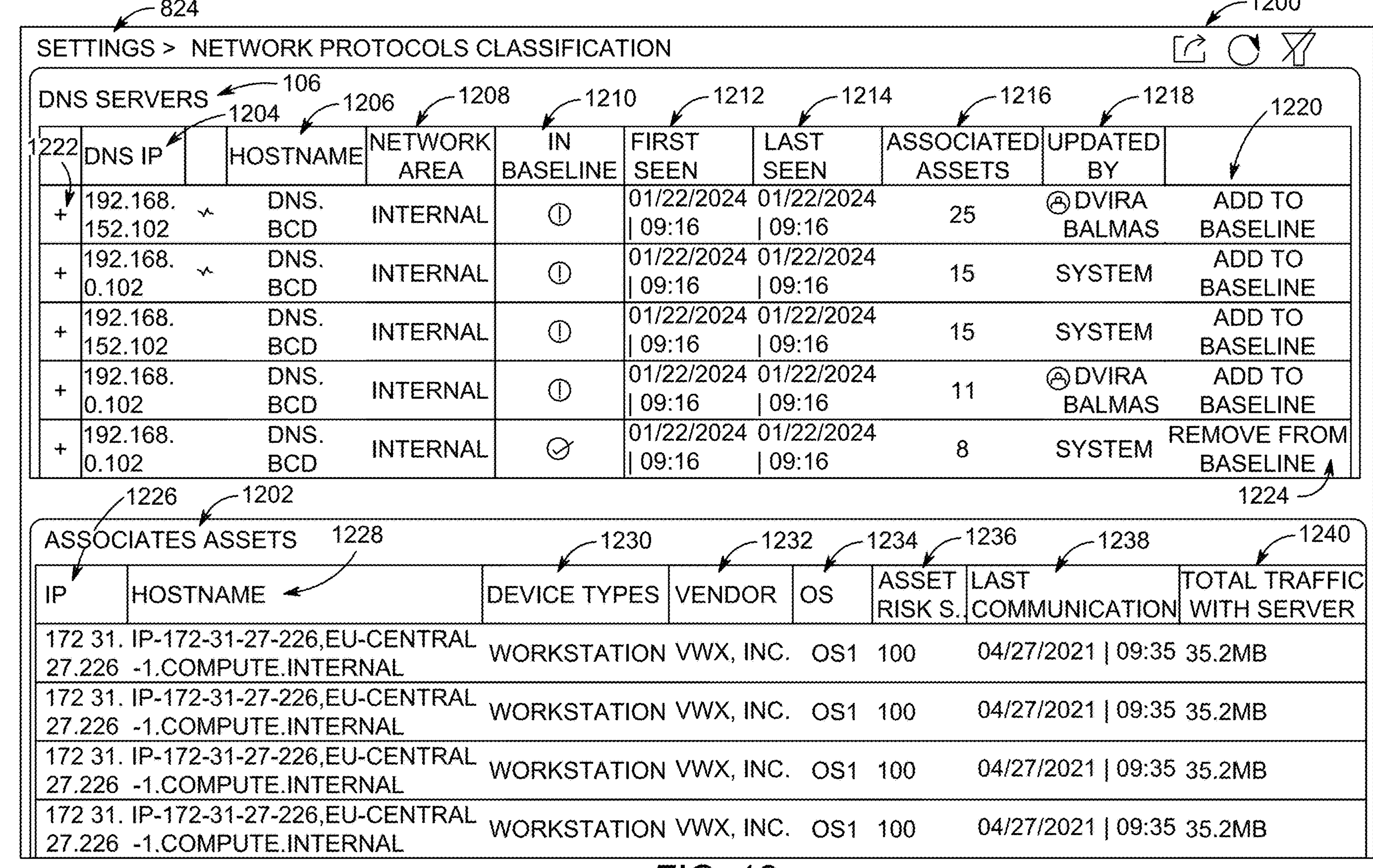
Figure 13A:
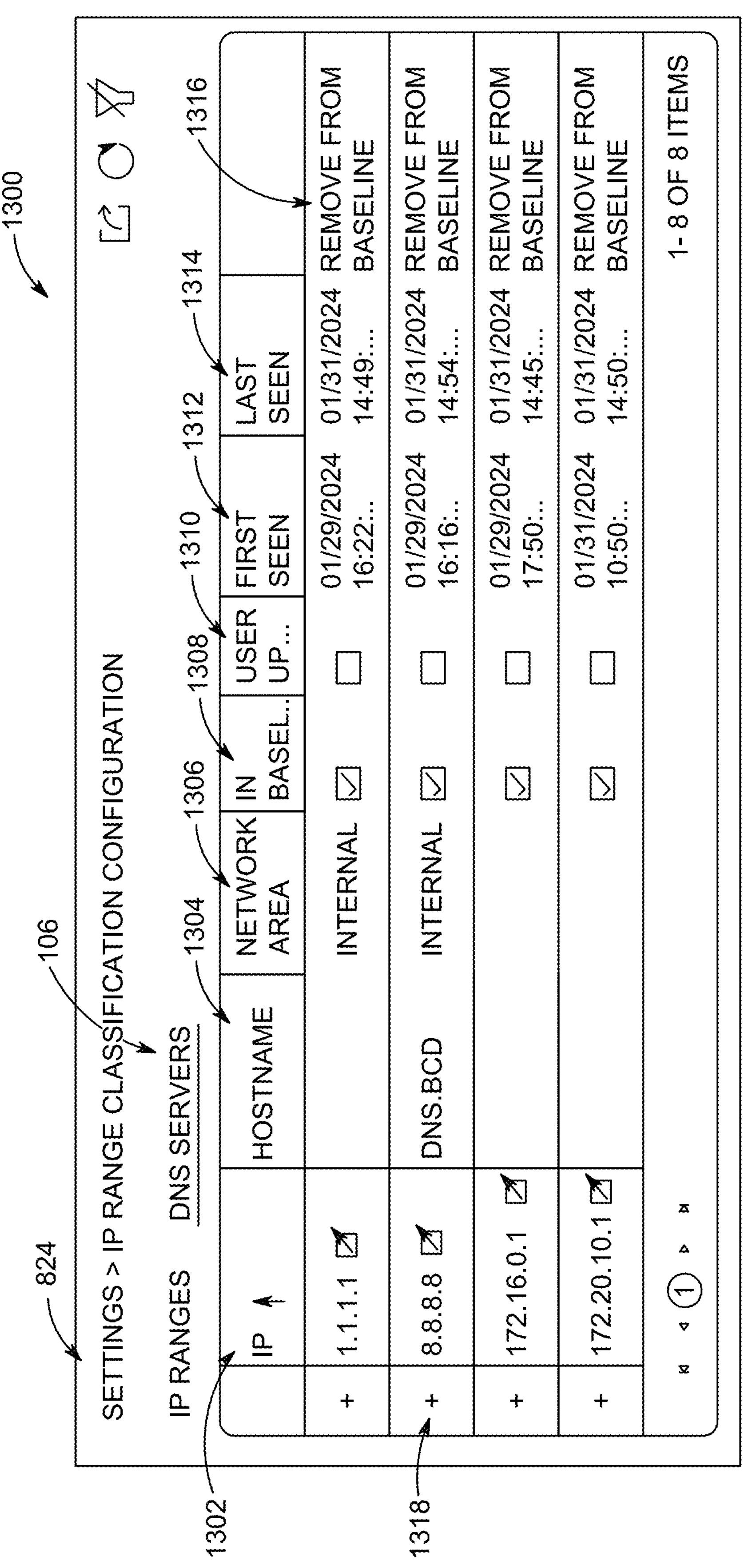
Figure 13B:
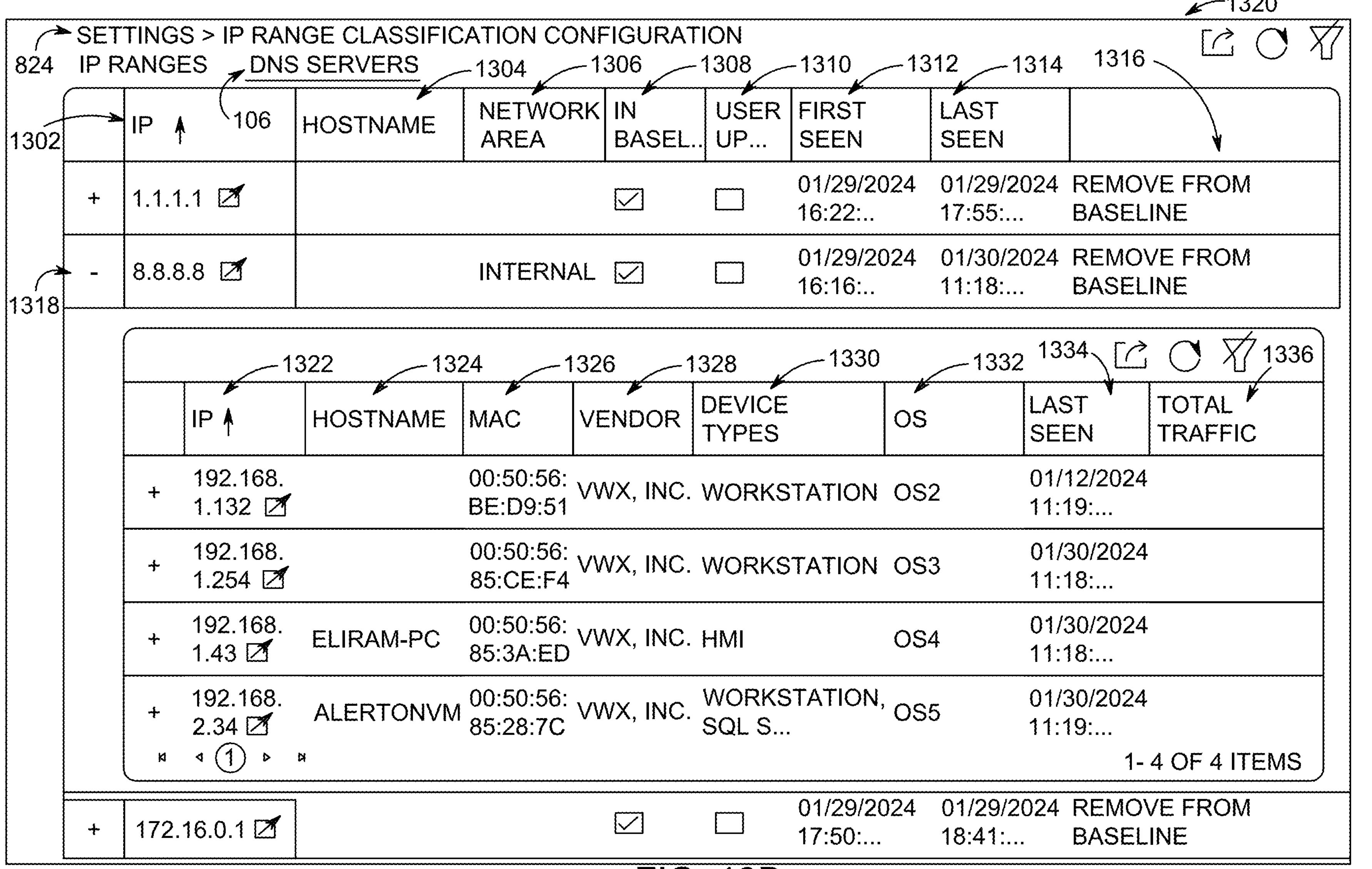
Figure 14:
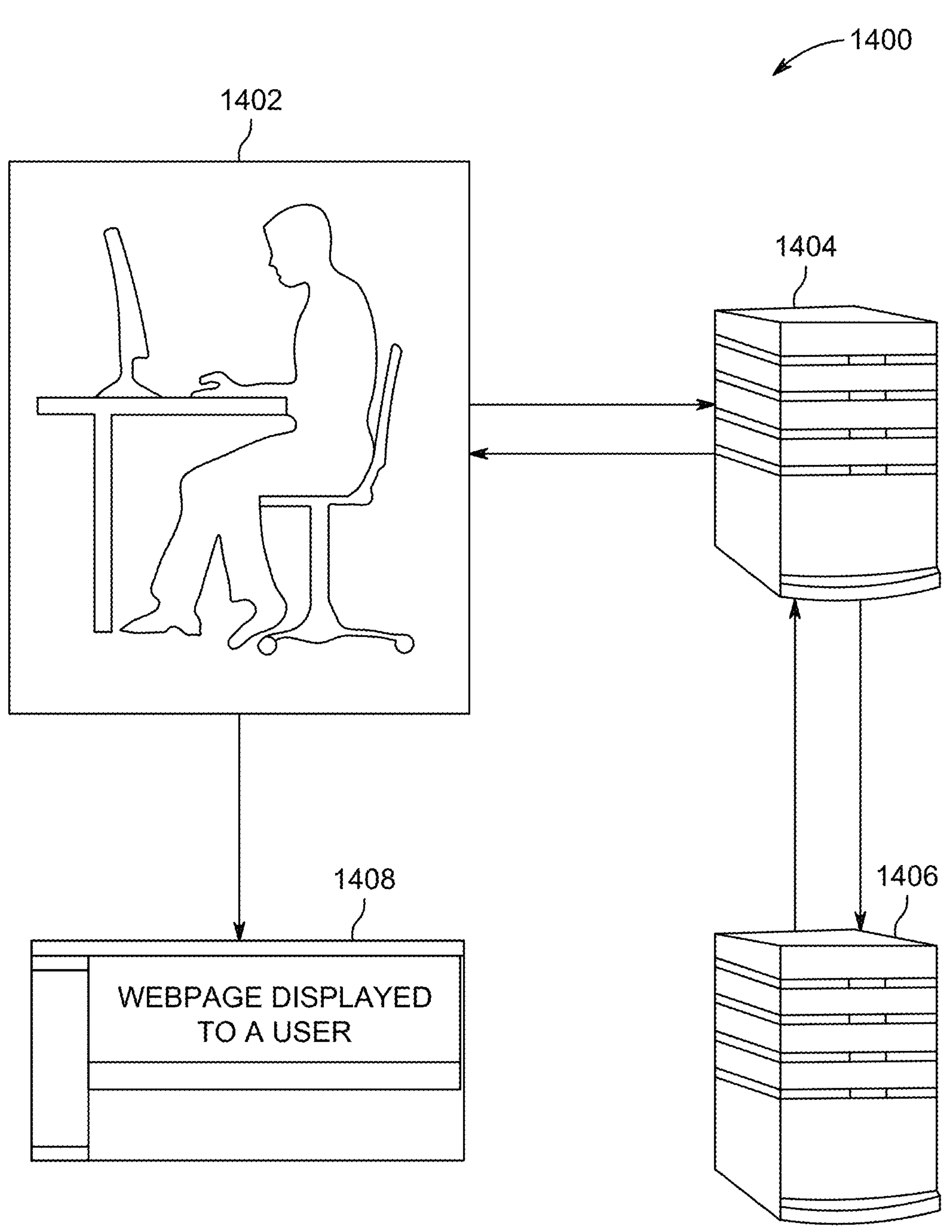
Figure 15:
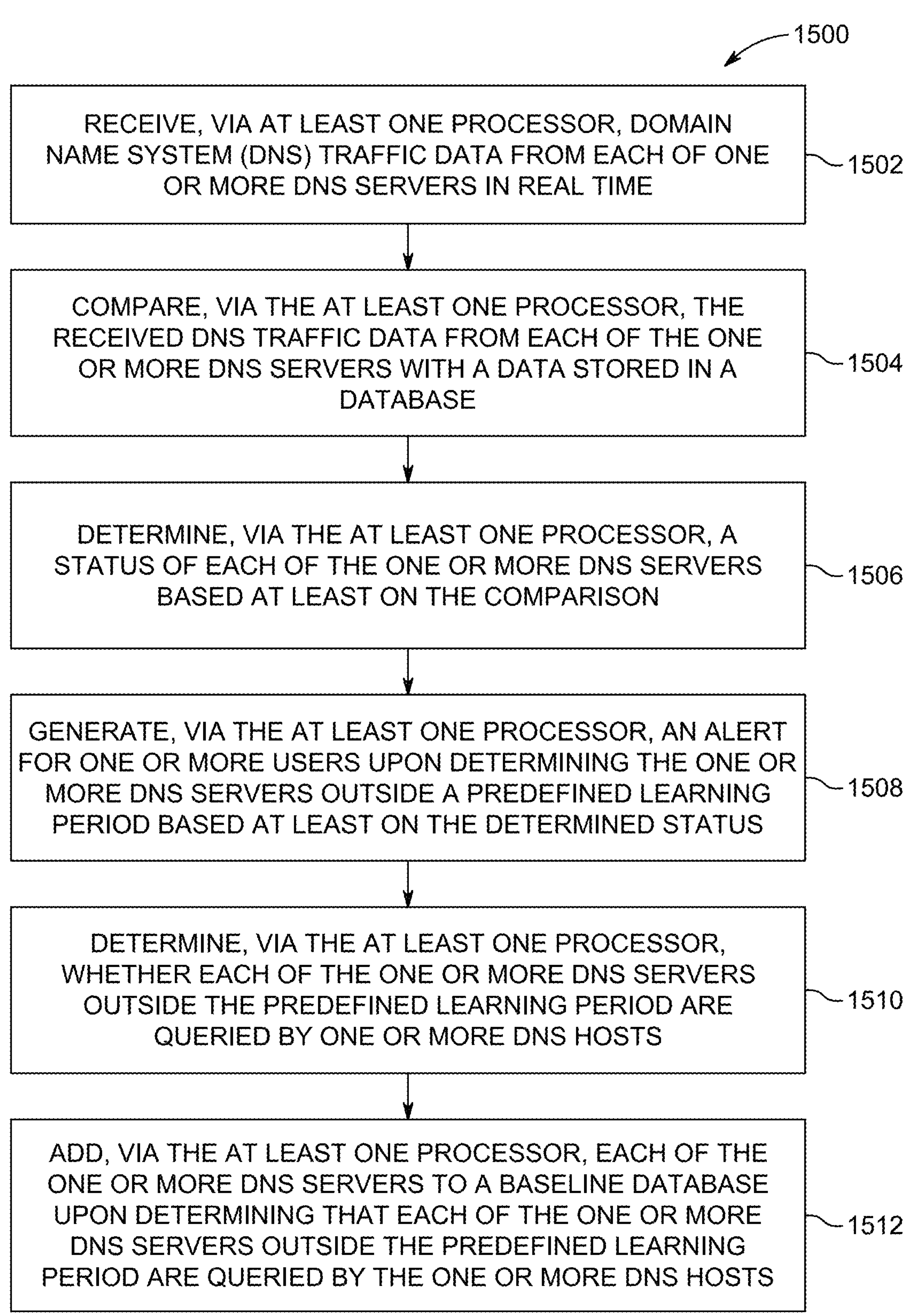

Having thus described certain example embodiments of the present disclosure in general terms, reference will hereinafter be made to the accompanying drawings, which are not necessarily drawn to scale, and wherein:

FIG. 1 illustrates a network diagram of a system for detecting anomalies within a domain name system (DNS) traffic in accordance with an example embodiment of the present disclosure;

FIG. 2 illustrates a block diagram of a server in accordance with an example embodiment of the present disclosure;

FIG. 3 illustrates a block diagram of an architecture of the system in accordance with an example embodiment of the present disclosure;

FIG. 4 illustrates a block diagram to determine inactive one or more DNS servers in accordance with an example embodiment of the present disclosure;

FIG. 5 illustrates a table showing one or more alerts generated by the system in accordance with an example embodiment of the present disclosure;

FIG. 6 illustrates a detailed flowchart showing a method for detecting anomalies within the DNS traffic in accordance with an example embodiment of the present disclosure;

FIG. 7 illustrates a user interface (UI) showing DNS anomalies in accordance with an example embodiment of the present disclosure;

FIG. 8 illustrates a UI showing additional information on generated alert in accordance with an example embodiment of the present disclosure;

FIG. 9 illustrates a UI showing an alert related to a detection of a DNS server outside a predefined learning period in accordance with an example embodiment of the present disclosure;

FIG. 10 illustrates a UI showing an alert related to a detection of an inactive DNS server in accordance with an example embodiment of the present disclosure;

FIG. 11 illustrates a UI showing settings for operating the system in accordance with an example embodiment of the present disclosure;

FIG. 12 illustrates a UI showing a network protocol classification within the settings in accordance with an example embodiment of the present disclosure;

FIGS. 13A-13B illustrate a UI showing an internet protocol (IP) range classification configuration within the settings in accordance with an example embodiment of the present disclosure;

FIG. 14 illustrates a block diagram involving one or more users and the one or more DNS servers in accordance with an example embodiment of the present disclosure; and FIG. 15 illustrates a flowchart showing a method for detecting anomalies within the DNS traffic, in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. As discussed herein, the protection devices may be referred to use by humans, but may also be used to raise and lower objects unless otherwise noted.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

The present disclosure provides various embodiments of methods and systems for detecting anomalies within a domain name system (DNS) traffic. Embodiments may be configured to be executed by at least one processor for receiving domain name system (DNS) traffic data from each of one or more DNS servers in real time. The DNS traffic data may comprise DNS queries and responses, internet protocol (IP) address of each of the one or more DNS servers, first seen date when each of the one or more DNS servers was first observed, last seen date when each of the one or more DNS servers was last observed, baseline information of each of the one or more DNS servers, or one or more client IP addresses interacted with each of the one or more DNS servers. Embodiments may be configured to compare the received DNS traffic data from each of the one or more DNS servers with a data stored in a database. The data may correspond to historical DNS traffic data related to one or more known DNS servers stored in the database during a predefined learning period.

Embodiments may be configured to determine a status of each of the one or more DNS servers based at least on the comparison. The status may correspond to a detection of the one or more DNS servers within the predefined learning period or the detection of the one or more DNS servers outside the predefined learning period. Embodiments may be configured to generate an alert for one or more users upon determining the one or more DNS servers outside the predefined learning period based at least on the determined status. Embodiments may be configured to determine whether each of the one or more DNS servers outside the predefined learning period is queried by one or more DNS hosts. Embodiments may be configured to add each of the one or more DNS servers to a baseline database upon determining that each of the one or more DNS servers outside the predefined learning period is queried by the one or more DNS hosts.

FIG. 1 illustrates a network diagram of a system 100 for detecting anomalies within a domain name system (DNS) traffic, in accordance with an example embodiment of the present disclosure. The network diagram may comprise a network 102 communicatively coupled to a server 104, one or more DNS servers 106, and a user device 108.

In some embodiments, the network 102 may be a communication network such as Internet or a cloud network, that may be configured to allow computing devices and processing systems to communicate with each other through wired network, wireless network, or a combination of both. In some embodiments, the network 102 may refer to as a distributed infrastructure that is configured to exchange of data, information, and resources among interconnected computing devices and systems. The network 102 may be designed to facilitate communication and collaboration across various locations, devices, and platforms. Those skilled in the art will recognize that wired devices may include, but are not limited to, wired networks such as Wide Area Networks (WANs) or Local Area Networks (LANs), while wireless devices may include wireless communications established via Radio Frequency (RF) signals or infrared signals. Various devices in the system 100 may connect to the network 102 in accordance with various wired and wireless communication protocols such as Transmission Control Protocol and Internet Protocol (TCP/IP), User Datagram Protocol (UDP), and 2G, 3G, or 4G communication protocols.

In some embodiments, the server 104 may be a computer or software module that is configured to provide centralized resources, data, or services to the user device 108 operated by a user. The server 104 may be configured to handle and manage one or more computational tasks and data processing within the system 100. In some embodiments, the server 104 may include storage systems, such as hard drives or storage arrays, to store and manage large volumes of data and information accessible to network users. In some embodiments, the server 104 may further provide centralized control and management capabilities, allowing network administrators to configure, monitor, and maintain network resources, security settings, and user access permissions from a single location.

In some embodiments, the server 104 may be configured to receive a DNS traffic data from each of one or more DNS servers 106 in real time. It will be apparent to one skilled in the art that the one or more DNS servers 106 corresponds to one or more specialized servers that translates human-readable domain names into numerical IP addresses required for locating and identifying computer services and devices with underlying network protocols of the network 102. Further, the DNS traffic data may comprise DNS queries and responses, internet protocol (IP) address of each of the one or more DNS servers 106, first seen date when each of the one or more DNS servers 106 was first observed, last seen date when each of the one or more DNS servers 106 was last observed, baseline information of each of the one or more DNS servers 106, or one or more client IP addresses interacted with each of the one or more DNS servers 106. In some embodiments, the historical DNS traffic data may comprise DNS raw data and DNS servers data. The DNS raw data may comprise one or more DNS queries and one or more DNS responses. The one or more DNS responses may comprise a list of questions that are answered by the one or more DNS servers based at least on the one or more DNS queries.

In some embodiments, the server 104 may further be configured to compare the received DNS traffic data from each of the one or more DNS servers 106 with a data stored in a database (not shown). The data may correspond to historical DNS traffic data related to one or more known DNS servers stored in the database during a predefined learning period. In some embodiments, the server 104 may further be configured to determine a status of each of the one or more DNS servers 106 based at least on the comparison. The status may correspond to a detection of the one or more DNS servers 106 within the predefined learning period or the detection of the one or more DNS servers 106 outside the predefined learning period. In some embodiments, the predefined learning period may correspond to a predefined time period during which the server 104 is configured to retrieve the historical DNS traffic data from the database. The predefined learning period may comprise at least one of hours, days, months, quarters, or years.

In some embodiments, the server 104 may further be configured to generate an alert for one or more users upon determining the one or more DNS servers 106 outside the predefined learning period based at least on the determined status. In some embodiments, the server 104 may further be configured to determine whether each of the one or more DNS servers 106 outside the predefined learning period is queried by one or more DNS hosts. The server 104 may further be configured to add each of the one or more DNS servers 106 to a baseline database upon determining that each of the one or more DNS servers 106 outside the predefined learning period is queried by the one or more DNS hosts. In some embodiments, the baseline database may comprise one or more baseline parameters. The one or more baseline parameters may comprise at least one of learning mode indicating if the database is currently in the predefined learning period, cumulative learning time spent in the predefined learning period, last queried date when the baseline database was queried or updated, last start time when the predefined learning period was started for the baseline database, and a type or a category of a baseline.

In some embodiments, the server 104 may further be configured to send the generated alert for the one or more users to the user device 108. The user device 108 may be equipped by a manager of a cybersecurity team responsible for addressing and reacting to the one or more DNS servers 106 outside the predefined learning period. In some embodiments, the generated alert for one or more users upon determining the one or more DNS servers 106 outside the predefined learning period may provide a summarized data to the one or more users that is easy to understand. In some embodiments, the user device 108 may include personal computers such as desktop computers, laptop computers, tablets, smartphones, or mobile devices.

It will be apparent to one skilled in the art that above-mentioned components of the system 100 have been provided only for illustration purposes, without departing from the scope of the disclosure.

FIG. 2 illustrates a block diagram of the server 104, in accordance with an example embodiment of the present disclosure. FIG. 3 illustrates a block diagram of an architecture of the system 100, in accordance with an example embodiment of the present disclosure. FIG. 4 illustrates a block diagram to determine inactive one or more DNS servers, in accordance with an example embodiment of the present disclosure. FIG. 5 illustrates a table showing one or more alerts generated by the system 100, in accordance with an example embodiment of the present disclosure. FIGS. 2-5 are described in conjunction with FIG. 1.

In some embodiments, the server 104 may comprise at least one processor 202, a memory 204, an input/output circuitry 206, a communication circuitry 208, a DNS requests anomalies JP i.e., DNS request anomalies module 210, a DNS server JP i.e., a DNS servers module 212, and a silent host PP i.e., silent host module 214. In some embodiments, the at least one processor 202 may be configured to receive the DNS traffic data from each of one or more DNS servers 106 in real time. The one or more DNS servers 106 may correspond to new DNS servers. The DNS traffic data may comprise DNS queries and responses, IP address of each of the one or more DNS servers 106, first seen date when each of the one or more DNS servers 106 was first observed, last seen date when each of the one or more DNS servers 106 was last observed, baseline information of each of the one or more DNS servers 106, or one or more client IP addresses interacted with each of the one or more DNS servers 106.

In one example, the IP address of each of the one or more DNS servers 106 may be stored as "dns_server_jp" within the memory 204. In another example, the first seen date when each of the one or more DNS servers 106 was first observed may be stored as "first_seen" within the memory 204. In another example, the last seen date when each of the one or more DNS servers 106 was last observed may be stored as "last_seen" within the memory 204. In another example, baseline information of each of the one or more DNS servers 106 may be stored as "in_baseline" within the memory 204. In yet another example, the one or more client IP addresses interacted with each of the one or more DNS servers 106 may be stored as "client_ips" within the memory 204.

In some embodiments, the at least one processor 202 may be configured to compare the received DNS traffic data from each of the one or more DNS servers 106 with a data stored in a database 302, as illustrated in FIG. 3. In some embodiments, the historical DNS traffic data may be received by the database 302 using a sniffer 304, as illustrated in FIG. 3. The sniffer 304 corresponds to a docket container, that is configured to capture and inspect packets containing the DNS traffic data traveling to and from the database 302. In some embodiments, the data may correspond to historical DNS traffic data. The historical traffic data may be related to one or more known DNS servers stored in the database 302 during the predefined learning period. The predefined learning period may correspond to a predefined timeframe during which the at least one processor is configured to process and store statistics based on the DNS traffic data into the database 302. The predefined learning period may comprise but not limited to at least, one of hours, days, months, quarters, or years.

Further, the historical DNS traffic data may comprise DNS raw data i.e., dns_raw_data 306 and DNS servers data i.e., dns_servers 308, as illustrated in FIG. 3. The DNS raw data 306 may comprise one or more DNS queries and one or more DNS responses. The one or more DNS responses may comprise a list of questions that are answered by the one or more DNS servers 106 based at least on the one or more DNS queries. In one example, the DNS raw data 306 may be stored as a "dns_raw_data" in the database 302. In another example, the DNS servers data 308 may be stored as a "dns_servers" in the database 302.

In some embodiments, the server 104 may comprise the DNS request anomalies module 210. The DNS request anomalies module 210 may correspond to a DNS requests anomalies job processor (JP). The DNS request anomalies module 210 may be configured to cyclically read the DNS raw data from the "dns_raw_data". Further, the DNS request anomalies module 210 may be configured to aggregate the read DNS raw data into the "dns_servers". In some embodiments, the DNS request anomalies module 210 may store count of the one or more DNS servers 106 in a DNS request anomalies database i.e., dns_requests_anomalies 310. The database 302 may maintain the one or more DNS servers 106 in the "dns_servers" of the database 302. In some embodiments, the server 104 may further comprise the DNS servers module 212. The DNS servers module 212 may correspond to a DNS server JP. The DNS servers module 212 may cyclically process the DNS servers data 308 from the "dns_servers". The DNS servers module 212 may monitor one or more DNS servers 106 and raise alerts if any of the one or more DNS servers 106 are detected outside of the predefined learning period. Additionally, the DNS servers module 212 may manage the transition out of the learning mode based on predefined criteria.

In some embodiments, the at least one processor 202 may be configured to determine the status of each of the one or more DNS servers 106 based at least on the comparison. The status may correspond to the detection of the one or more DNS servers 106 within the predefined learning period or the detection of the one or more DNS servers 106 outside the predefined learning period. In one example, the detection of the one or more DNS servers 106 within the predefined learning period may correspond to the status as "learning". In another example, the detection of the one or more DNS servers 106 outside the predefined learning period may correspond to the status as "outside of the learning period" or "enforced".

In some embodiments, the at least one processor 202 may be configured to generate the alert for one or more users upon determining the one or more DNS servers 106 outside the predefined learning period based at least on the determined status. In some embodiments, the at least one processor may be configured to display the alert on the user device 108 of the one or more users. The alert may comprise at least one of alert type, description of alert, and resolution of the alert. In one example, the alert type may comprise active servers or inactive servers. The description of alert may provide detailed information about the issue or situation, explaining what has occurred and any relevant background or specifics needed for comprehension. The resolution of the alert may provide actionable steps or solutions to resolve the issue, guiding one or more users on how to address and fix the problem effectively, ensuring a smooth and informed response to the alert.

As illustrated in FIG. 5, the alert generated by the at least one processor 202 may comprise the type of alert as an "Alert" 502, the description of the alert as a "Description" 504, a learning time 506, and the resolution of the alert as a "value" 508. In one example, the "Alert" 502 may comprise a "New DNS Server Detected" with the "Description" 504 as "Raised when a new DNS server is found after learning mode", having a learning time 506 of "1 week", and providing a value 508 as "Notifies the user on potential breach. Provides visibility of DNS behavior in the network". In another example, the "Alert" 502 may comprise "Inactive DNS Server" with the "Description" 504 as "Raised when the server went silent in port 53", having a learning time 506 of "1 week", and providing a value 508 as "Notifies the user on possible fault in the network. Provides visibility of DNS behavior in the network".

In some embodiments, the at least one processor 202 may further be configured to determine whether each of the one or more DNS servers 106 outside the predefined learning period is queried by one or more DNS hosts i.e., hosts 402, as illustrated in FIG. 4. The one or more DNS hosts 402 may correspond to hosts. Further, the server 104 may comprise the silent host module 214. The silent host module 214 may correspond to a silent host processor (PP). The silent host module 214 may be configured to identify one or more known DNS servers that have become silent.

In some embodiments, the at least one processor 202 may be configured to add each of the one or more DNS servers 106 to a baseline database i.e., baselines_metadata 312 upon determining that each of the one or more DNS servers 106 outside the predefined learning period is queried by the one or more DNS hosts 402. The baseline database 312 may comprise one or more baseline parameters. The one or more baseline parameters may comprise at least one of learning mode indicating if the database 302 is currently in the predefined learning period, cumulative learning time spent in the predefined learning period, last queried date when the baseline database 312 was queried or updated, last start time when the predefined learning period was started for the baseline database 312, and a type or a category of a baseline.

In one example, the learning mode indicating if the database 302 is currently in the predefine leaning period parameter may be stored as "learning_mode" within the database 302. In another example, the cumulative learning time spent in the predefined learning period parameter may be stored as "cumulative_learning_time" within the database 302. In yet another example, the last queried date when the baseline database was queried or updated parameter may be stored as "last_queried" within the database 302. In another example, the last start time when the predefined learning period was started for the baseline database 312 parameter may be stored as "learning_start_time" within the database 302. In yet another example, the type or the category of the baseline parameter may be stored as "type" within the database 302.

Further, the at least one processor 202 may track a state of the predefined learning period. Furthermore, the at least one processor 202 may store the tracked state in the baseline database 312. The generated alert and the addition of each of the one or more DNS servers 106 in the baseline database 312 may enable the at least one processor 202 to learn and adapt to the specific normal behavior of each network having the DNS traffic. Further, learning and adapting to the specific normal behavior of each network having the DNS traffic may enhance the accuracy of anomaly detection within the DNS traffic.

In some embodiments, the at least one processor 202 may be configured to generate a union of the one or more DNS servers 106 and the one or more known DNS servers, upon determining that the one or more DNS servers 106 are within the predefined learning period. Further, the at least one processor 202 may be configured to determine another one or more DNS servers 106 within the union generated. Furthermore, the at least one processor 202 may be configured to determine whether one or more parameters of the another one or more DNS servers 106 within the union are newer than one or more parameters of the one or more known DNS servers upon determining the another one or more DNS servers 106 are within the union. The one or more parameters of the another one or more DNS servers 106 and the one or more parameters of the one or more known DNS servers may comprise at least last seen date. Thereafter, the at least one processor 202 may be configured to update the one or more parameters of the another one or more DNS servers 106 within the database 302 upon determining the one or more parameters of the another one or more DNS servers 106 within the union are newer than one or more parameters of the one or more known DNS servers.

In some embodiments, the at least one processor 202 may be configured to determine the one or more parameters of the another one or more DNS servers 106 are older than a predefined period. Further, the predefined period may correspond to a forgetting period. The forgetting period may correspond to a time period after which the at least one processor 202 is configured to remove the another one or more DNS servers 106 from the database 302. Thereafter, the at least one processor 202 may be configured to remove a data associated with each of the another one or more DNS servers 106 upon determining the one or more parameters of the another one or more DNS servers 106 are older than the predefined period. The data associated with each of the another one or more DNS servers may correspond to a "server document" that contains the all the details of each of the another one or more DNS servers 106. Further, the at least one processor 202 may continuously identify whether each of the one or more DNS servers 106 stored in the database 302 have become silent. Thereafter, the at least one processor 202 may remove each of the one or more DNS servers 106 corresponding to "Old servers". The old servers may be silent from the database 302 after the predefined period for each DNS server is elapsed.

The at least one processor 202 may include suitable logic, circuitry, and/or interfaces that are operable to execute one or more instructions stored in the memory 204 to perform predetermined operations. In one embodiment, the at least one processor 202 may be configured to decode and execute any instruction received from one or more other electronic devices or server(s). The at least one processor 202 may be configured to execute one or more computer-readable program instructions, such as program instructions to carry out any of the functions described in this description. Further, the at least one processor may be implemented using one or more processor technologies known in the art. Examples of the at least one processor 116 include, but are not limited to, one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor).

In some embodiments, the memory 204 may be configured to store a set of instructions and data executed by the at least one processor 202. Further, the memory 204 may include the one or more instructions that are executable by the at least one processor 202 to perform specific operations. The memory 204 may be configured to include the instructions to receive the DNS traffic data from each of one or more DNS servers in real time. The memory 204 may be configured to include the instructions to compare the received DNS traffic data from each of the one or more DNS servers with the data stored in the database 302. Further, the memory 204 may be configured to include the instructions to determine the status of each of the one or more DNS servers based at least on the comparison. The memory 204 may be configured to include the instructions to generate the alert for the one or more users upon determining the one or more DNS servers outside the predefined learning period based at least on the determined status.

The memory 204 may be configured to include the instructions to determine whether each of the one or more DNS servers outside the predefined learning period is queried by one or more DNS hosts. The memory 204 may be configured to include the instructions to add each of the one or more DNS servers to the baseline database 312 upon determining that each of the one or more DNS servers outside the predefined learning period is queried by the one or more DNS hosts. It is apparent to a person with ordinary skill in the art that the one or more instructions stored in the memory 204 enable the hardware of the server 104 to perform the predetermined operations. Some of the commonly known memory implementations include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

In some embodiments, the server 104 may further comprise the input/output circuitry 206. The input/output circuitry 206 may enable the one or more users to communicate or interface with the server 104, via the user device 108. The user device 108 may include N number of user devices. In some embodiments, the input/output circuitry 206 may act as a medium to transmit input from the interface to and from the server 104. In some embodiments, the input/output circuitry 206 may refer to the hardware and software components that facilitate the exchange of information between the user device 108 and the server 104. In one example, the user device 108 may include a graphical user interface (GUI) (not shown) as input circuitry to allow the one or more users to input the first set of data. The input/output circuitry 206 may include various input devices such as keyboards, barcode scanners, GUI for the one or more users to provide data and various output devices such as displays, printers for the one or more users to receive data. In another example, the input/output circuitry 206 may include various output circuitry such as a display to show the generated probability score.

In some embodiments, the server 104 may further comprise the communication circuitry 208. The communication circuitry 208 may allow the server 104 to exchange data or information with other systems or apparatuses. Further, the communication circuitry 208 may include network interfaces, protocols, and software modules responsible for sending and receiving data or information. In some embodiments, the communication circuitry 208 may include Ethernet ports, Wi-Fi adapters, or communication protocols like HTTP or MQTT for connecting with other systems. The communication circuitry 208 may further include components such as communication modules (e.g., Wi-Fi, Ethernet, cellular), transceivers, antennas, and protocols (e.g., TCP/IP, MQTT, SNMP) for exchanging data with other systems or network devices. The communication circuitry 208 may allow the server 104 to stay up-to-date and accurately track the generated probability.

In some embodiments, the input/output circuitry 206 and the communication circuitry 208 may be configured to integrate the at least one normalized alarm data with other systems such as Supervisory Control and Data Acquisition (SCADA), Building Management Systems (BMS), Enterprise Asset Management (EAM) systems, or third-party monitoring platforms for centralized monitoring, analysis, and control by operators and automated processes. It will be apparent to one skilled in the art the above-mentioned components of the server 104 have been provided only for illustration purposes, without departing from the scope of the disclosure.

FIG. 6 illustrates a detailed flowchart 600 showing a method for detecting anomalies within the domain name system (DNS) traffic, in accordance with an example embodiment of the present disclosure. FIG. 6 is described in conjunction with FIGS. 1-5.

At operation 602, the at least one processor 202 may be configured to receive the DNS servers data 308 from the database 302 i.e., retrieve DNS servers data 308 from the database 302. At operation 604, the at least one processor 202 may be configured to determine whether the status is learning. In one instance, when the status is learning, the at least one processor 202 may be configured to upsert the one or more DNS servers 106 found in the DNS servers data 308, in the database 302, at operation 606. In one example, the at least one processor 202 may upsert all domains, i.e., the one or more DNS servers 106, found, "setOnInsert first_seen" in the database 302. At operation 608, the at least one processor 202 may be configured to determine whether the predefined learning period has passed. In one instance, if the predefined learning period is passed, the at least one processor 202 may be configured to set status to "enforce", at operation 610. At operation 612, the at least one processor 202 may be configured to alert on each of the one or more DNS servers 106 with all unanswered.

In another instance, when the status is not learning, the at least one processor 202 may be configured to find a difference between one or more known DNS servers and queried one or more DNS servers 106, at operation 614. In some embodiments, after the operation 612, the flow of the system may be directed to the operation 614. At operation 616, the at least one processor 202 may be configured to start a loop to find the difference. The difference may correspond to a difference between the one or more known DNS servers that are stored in the database 302 and the queried one or more DNS servers 106. At operation 618, the at least one processor 202 may be configured to determine whether there are another one or more DNS servers 106 in the difference. In one instance, when there are another one or more DNS servers 106 in the difference, the at least one processor 202 may be configured to save the another one or more DNS servers 106 to the database 302, at operation 620. In another instance, when there are no another one or more DNS servers 106 in the difference, the at least one processor 202 may be configured to generate the union of one or more known DNS servers and queried one or more DNS servers 106, at operation 624.

At operation 622, the at least one processor 202 may be configured to obtain all relevant one or more DNS servers 106 and raise the alert to the one or more users. After raising the alert, the flow may be redirected to the operation 618 to again determine whether there are another one or more DNS servers 106 in the difference. At operation 626, the at least one processor 202 may be configured to start a loop. The loop may be started for generating the union. At operation 628, the at least one processor 202 may be configured to determine whether there are another one or more DNS servers 106 in the union. In one instance, when there are no another one or more DNS servers 106 in the union, the at least one processor 202 may be configured to end the function at operation 630.

In another instance, when there are another one or more DNS servers in the union, the at least one processor 202 may be configured to determine whether last seen of queried one or more DNS servers 106 is newer than the one or more known DNS servers, at operation 632. Herein, in one instance, when the last seen of queried one or more DNS servers 106 is newer than the one or more known DNS servers, the at least one processor 202 may be configured to update the last seen, at operation 634. In another instance, when the last seen of queried one or more DNS servers 106 is not newer than the one or more known DNS servers, the at least one processor 202 may be configured to determine whether the last seen is older than the forgetting period, at operation 636. Herein, in one instance, when the last seen is older than forgetting period, the at least one processor 202 may be configured to remove the server document, at operation 638. After removing the server document, the at least one processor 202 may be configured to redirect the flow to the operation 628. In another case, when the last seen is not older than the forgetting period, the at least one processor 202 may be configured to redirect the flow to the operation 628. From the operation 602 to the operation 638, the system 100 may be configured to continuously monitor the another one or more DNS servers.

FIG. 7 illustrates a user interface (UI) 700 showing DNS anomalies, in accordance with an example embodiment of the present disclosure. FIG. 7 is described in conjunction with FIGS. 1-6.

The UI 700 may provide DNS anomalies based on the generated alert by the at least one processor 202. The DNS anomalies may correspond to the one or more DNS servers 106 outside the predefined learning period. The DNS anomalies may comprise a DNS server block 702, a queries count block 704 and an unsolicited responses count block 706. The DNS server block 702 may identify the specific servers involved. The queries count block 704 may tally the number of DNS queries made. The unsolicited response count block 706 may provide the unexpected DNS responses received.

In one example, the DNS anomalies for 192.168.0.100 may comprise a DNS server "shaver.services.abc.com" in the DNS server block 702, a query count of "6" in the queries count bock 704 and an unsolicited response count of "534" in the unsolicited response count block 706. In another example, the DNS anomalies for 192.168.0.100 may comprise a DNS server "shaver.prod.xyz.net" in the DNS server block 702, a query count of "3" in the queries count bock 704 and an unsolicited response count of "25" in the unsolicited response count block 706. In yet another example, the DNS anomalies for 192.168.0.100 may comprise a DNS server "security.def.com" in the DNS server block 702, a query count of "2" in the queries count bock 704 and an unsolicited response count of "1459" in the unsolicited response count block 706.

FIG. 8 illustrates a UI 800 showing additional information on the generated alert, in accordance with an example embodiment of the present disclosure. FIG. 8 is described in conjunction with FIGS. 1-7.

In some embodiments, the UI 800 may comprise additional information on the generated alert. The additional information on the generated alert may correspond to alert additional information. The alert additional information may comprise a list having a dashboard 802, an alerts manager 804 having alerts 806 and activity log 808, a security analyzer 810, an assets manager 812, a user activity analyzer 814, network maps 816, a traffic analyzer 818, an inspector 820, a report creator 822, settings 824, and admin details 826. In some embodiments, the UI may comprise a pop-up window 828 having the alert additional information. The alert additional information may comprise information related to domain name of the one or more DNS servers 106 outside the predefined learning period.

In one example, the alert additional information may comprise the domain name "nectar.dolphin.jasmine.com:". In another example, the alert additional information may comprise the domain name "Moonlight.quill.ivy.com:". In yet another example, the alert additional information may comprise domain name "Ivy.wave.waterfall.com:". In another example, the alert additional information may comprise the domain name "Happiness.unicorn.wave.com:". In yet another example, the alert additional information may comprise the domain name "Orchid.parrot.octopus.com:". In another example, the alert additional information may comprise the domain name "Kangaroo.sunset.eagle.org:".

FIG. 9 illustrates a UI 900 showing an alert related to a detection of a DNS server outside the predefined learning period, in accordance with an example embodiment of the present disclosure. FIG. 9 is described in conjunction with FIGS. 1-8.

In some embodiments, the UI 900 may comprise a window 902 showing an alert view for the DNS server outside the predefined learning period. In one example, the UI 900 may comprise the alert view showing that "unknown DNS server has been detected". The UI 900 may comprise a message representing "The system has detected communication with an out of baseline DNS server (10.13.1.31 (erpprod.rafadom.local))." Further, the UI 900 may show an ID as "3", a severity as "Log", a last event time as "Jun. 18, 2020 16:01:40", and no of events as "24". The UI 900 may comprise a resolve button 904. The resolve button 904 may be clicked by the user to resolve the issue with the DNS server detected outside the predefined learning period. The UI 900 may show a progress associated with resolving the issue as "In-progress" 914, next to the resolve button 904.

Further, the UI 900 may provide explanation 906 for the DNS server. In one example, the explanation 906 may comprise "1. DNS is a domain Name Resolution protocol responsible for converting name record to IP addresses". The explanation 906 may further comprise "2. A DNS server connection was detected that was not included in the DNS baseline". The explanation 906 may further comprise "3. Communication might involve transferring sensitive data to an external server." The explanation 906 may further comprise "4. Unauthorized DNS server could redirect traffic for malicious purposes." The explanation 906 may further comprise "5. Filter the conversations by DNs protocol to view the hosts that communicated with the unknown DNs server.".

In some embodiments, the UI 900 may provide resolution recommendations 908 for the unknown DNS server. In one example, the resolution recommendations 908 may comprise "1. Verify the integrity of the new DNS server. The resolution recommendation 908 may further comprise "2. Investigate the DNS traffic to determine whether a breach exists and what extent it has been breached." The resolution recommendation 908 may further comprise "3. Run anti-malware on the hosts communicated with the server.". The resolution recommendation 908 may further comprise "4. Utilize DNS filtering services to prevent access to malicious or unapproved DNS servers.".

In some embodiments, the UI 900 may comprise last comment and actions 910 for the DNS server as "all". In some embodiments, the UI 900 may comprise admin information as "Admin Feb. 6, 2024 10:52:21 Alerts first seen by admin". Further, the UI 900 may comprise a "+Add Comment" button 912. In one example, one or more users may add comments for the unknown DNS server detected using the "+Add Comment" button 912.

FIG. 10 illustrates a UI 1000 showing an alert related to a detection of an inactive DNS server, in accordance with an example embodiment of the present disclosure. FIG. 10 is described in conjunction with FIGS. 1-9.

In some embodiments, the UI 1000 may comprise a window 1002 showing an alert view for the inactive DNS server. In one example, the UI 1000 may comprise the alert view showing the "inactive DNS server". The UI 1000 may comprise a message representing "The DNS server 172.27.176.1 has not been seen communicating for 2 days and 3 hours." Further, the UI 1000 may show an ID as "1", a severity as "Low", and an alert creation time, created as "Jan. 30, 2024 16:30:50". The UI 1000 may comprise a resolve button 1004. The resolve button 1004 may be clicked by the user to resolve the issue with the inactive DNS server. The UI 1000 may show a progress associated with resolving the issue as "In-progress" 1014, next to the resolve button 1004.

Further, the UI 1000 may provide explanation 1006 for the inactive DNS server. The explanation 1006 may comprise "1. A DNS server was not communicating for a period that deviates from its normal behavior". The explanation 1006 may further comprise "2. This anomaly might be due to a hardware issue, device overload (high CPU/RAM usage, etc.), network configuration problems, or network congestion.". The explanation 1006 may further comprise "3. This anomaly might also be due to physical disconnection of the device from the network, shutdown, or loss of power."

In some embodiments, the UI 1000 may provide resolution recommendations 1008 for the unknown DNS server. The resolution recommendations 1008 may comprise "1. Make sure that the server is still physically connected to the network, and that it is turned on. Visual check is recommended, in order to ensure that the asset was not swapped with another (for a malicious reason, or by mistake)". The resolution recommendation 1008 may further comprise "2. Monitor the bandwidth consumption of the network in order to find congestion problems: a. If you detect high bandwidth consumption, determine its source. The source may be either malicious (DoS attack attempt) or benign; b. Fix the problem that caused the high bandwidth consumption; c. If it is not possible to reduce the network bandwidth consumption (that is, the current level of bandwidth consumption is actually required for day-to-day network operations), consider upgrading your network equipment. The maximum utilization of a network should be no more than 50% of the theoretical speed of the network equipment." The resolution recommendation 1008 may further comprise "3. Investigate whether someone has modified the configuration of this server. This includes configuration of the server itself, or of the related network equipment.". The resolution recommendation 1008 may further comprise "4. Verify that the DNS server is relevant and should be included in the DNS Servers Baseline.".

In some embodiments, the UI 1000 may comprise last comment and actions 1010 for the inactive DNS server. The UI 1000 may comprise admin information as "Admin Jan. 31, 2024 15:35:59 Alerts first seen by admin". Further, the UI 1000 may comprise a "+Add Comment" button 1012. In one example embodiment, one or more users may add comments for the unknown DNS server detected using the "+Add Comment" button 1012.

FIG. 11 illustrates a UI 1100 showing the settings 824 for operating the system 100, in accordance with an example embodiment of the present disclosure. FIG. 11 is described in conjunction with FIGS. 1-10.

The UI 1100 may comprise the settings 824 for operating the system 100. The settings 824 may facilitate the management of DNS traffic and associated components. The UI 1100 may allow one or more users to control and customize how the system 100 functions, ensuring the system 100 aligns with organizational needs and preferences. Through the UI 1100, the one or more users may access and modify configurations that impact data handling, security protocols, and system performance, enhancing the overall efficiency and effectiveness of DNS traffic management.

The settings 824 may comprise "data cleanup" option 1102, "offline settings" option 1104. The "data cleanup" option 1102 and the "offline settings" option 1104 may be crucial for maintaining integrity of the system 100 and performance. The "data cleanup" option 1102 may involve processes to remove outdated, irrelevant, or erroneous data from the system 100, ensuring that only accurate and necessary information is retained. The removal may help in optimizing storage and improving data retrieval speeds. The "offline settings" option 1104 may allow the system 100 to operate without an active internet connection that is essential for environments with strict security requirements or where internet access is unreliable. The "offline settings" option 1104 may ensure that the system 100 continues to function and log critical data even when disconnected from the internet.

Further, the settings 824 may comprise actions 1106 in the UI 1100. The actions 1106 may comprise an "IP range classification configuration" option 1108, a "device type rules" option 1110, an "asset risk score configuration" option 1112, an "inspection tuning" option 1114, an "active polling" option 1116, a "map file management" option 1118, a "create PCAP file" option 1120, and a "DNS servers baseline" option 1122. The "IP range classification configuration" option 1108 may involve categorizing IP addresses into predefined ranges for better organization and management that allows the one or more users to define rules and parameters for grouping IP addresses, facilitating easier monitoring and control of network traffic. By classifying IP ranges, the one or more users may apply specific security policies, track usage patterns, and detect anomalies within defined segments of the network 102. The "IP range classification configuration" option 1108 may enhance the ability to manage and secure network operations, ensuring that IP addresses are appropriately monitored and managed.

In some embodiments, the "device type rules" option 1110 and the "asset risk score configuration" option 1112 may enable the one or more users to establish guidelines for handling different types of devices and assessing their associated risks. The "device type rules" option 1110 may help in identifying and categorizing devices based on characteristics and roles within the network 102, ensuring that each device type adheres to relevant security protocols and operational guidelines. The "asset risk score configuration" option 1112 may allow the one or more users to assign risk levels to various assets based on predefined criteria, aiding in the prioritization of security measures and resource allocation. Together, the "device type rules" option 1110 and the "asset risk score configuration" option 1112 may enhance the ability of the system 100 to manage devices and assess risks effectively.

In some embodiments, the "inspection tuning" option 1114 and the "active polling" option 1116 may optimize monitoring and data collection processes of the system 100. The "inspection tuning" option 1114 may allow the one or more users to adjust parameters for inspecting DNS traffic, ensuring that the system 100 captures the most relevant data without being overwhelmed by unnecessary information. The "active polling" option 1116 may involve regularly querying the one or more DNS servers 106 to gather real-time data on the status and activity. The "inspection tuning" option 1114 and the "active polling" option 1116 may help in maintaining an up-to-date understanding of the network's DNS traffic, allowing for timely detection of issues and ensuring continuous monitoring of performance of the one or more DNS servers 106.

In some embodiments, the "map file management" option 1118 and the "create PCAP file" option 1120 may support data organization and detailed analysis of network traffic. The "map file management" option 1118 may involve maintaining and updating files that map network configurations, aiding in the visualization and understanding of the network's structure. The "create PCAP file" option 1120 may enable the one or more users to capture and store detailed network traffic data for analysis. The "create PCAP file" option 1120 is invaluable for troubleshooting, forensic analysis, and understanding the behavior of DNS traffic. By providing settings 824 for the map file management 1118 and the "create PCAP file" option 1120, the system 100 may enhance the capability to monitor, analyze, and manage DNS traffic comprehensively.

In some embodiments, the DNS servers baseline 1122 may involve establishing a standard or a baseline for performance and behavior of the one or more DNS servers 106. The baseline includes historical DNS traffic data on DNS queries and responses, IP addresses, and interaction patterns with client IPs. By comparing the DNS traffic data against the baseline, the system 100 may detect anomalies and identify the one or more DNS servers 106 that deviate from expected behavior. Establishing the baseline is crucial for maintaining the security and integrity of DNS traffic management.

FIG. 12 illustrates a UI 1200 showing a network protocol classification within the settings 824, in accordance with an example embodiment of the present disclosure. FIG. 12 is described in conjunction with FIGS. 1-6.

In some embodiments, the UI 1200 may comprise the settings 824 showing the network protocols classification. The network protocols classification may comprise one or more DNS servers 106 and associates assets 1202. The one or more DNS servers 106 may comprise a DNS IP 1204, a hostname 1206, a network area 1208, an "in baseline" 1210, a first seen 1212, a last seen 1214, associated assets 1216, and "updated by" 1218. The DNS IP 1204 may correspond to a specific IP address of the one or more DNS servers 106. The hostname 1206 may correspond to a human-readable name assigned to the server 104. The network area 1208 may indicate a segment of the network the server 104 operates in. The "in baseline" 1210 may signify whether the server is part of the baseline database 312. The "first seen" 1212 and the "last seen" 1214 may indicate the initial and most recent detection of the server within the network, respectively. The associated assets 1216 may correspond to listing other network resources linked to the server 104. The "updated by" 1218 may indicate an entity responsible for the most recent updates to the server 104 information. Further, the UI 1200 may add the DNS server to the baseline database 312 using a "Add to baseline" button 1220. Further, each of the DNS IP 1204 may be expanded using the "+" button 1222. The UI 1200 may provide a "Remove from baseline" button 1224 to remove the DNS server to the baseline database 312.

In one example, the one or more DNS servers may comprise "192.168.152.102" as the DNS IP 1204, "DNS.bcd" as the hostname 1206, "Internal" as the network area 1208, a symbol indicating that the "192.168.152.102" is not part of the baseline database 312, "Jan. 22, 2024|09:16" as the first seen 1212 and the last seen 1214, "25" as the associated assets 1216, and updated by "Dvira Balmas". In another example, the one or more DNS servers may comprise "192.168.0.102" as the DNS IP 1204, "DNS.bcd" as the hostname 1206, "Internal" as the network area 1208, a symbol indicating that the "192.168.0.102" is not part of the baseline database 312, "Jan. 22, 2024 09:16" as the first seen 1212 and the last seen 1214, "15" as the associated assets 1216, and updated by a system. In yet another example embodiment, the one or more DNS servers may comprise "192.168.152.102" as the DNS IP 1204, "DNS.bcd" as the hostname 1206, "Internal" as the network area 1208, a symbol indicating that the "192.168.152.102" is not part of the baseline database 312, "Jan. 22, 2024|09:16" as the first seen 1212 and the last seen 1214, "15" as the associated assets, 1216 and updated by the system.

In another example, the one or more DNS servers may comprise "192.168.0.102" as the DNS IP 1204, "DNS.bcd" as the hostname 1206, "Internal" as the network area 1208, a symbol indicating that the "192.168.0.102" is not part of the baseline database 312, "Jan. 22, 2024|09:16" as the first seen 1212 and the last seen 1214, "11" as the associated assets 1216, and updated by "Dvira Balmas". In yet another example embodiment, the one or more DNS servers may comprise "192.168.0.102" as the DNS IP 1204, "DNS.bcd" as the hostname 1206, "Internal" as the network area 1208, a symbol indicating that the "192.168.152.102" is the part of the baseline database 312, "Jan. 22, 2024|09:16" as the first seen 1212 and the last seen 1214, "8" as the associated assets 1216, and updated by the system.

Further, the associated assets 1216 may comprise IP 1226, a hostname 1228, device types 1230, a vendor 1232, an operating system (OS) 1234, an asset risk score 1236, a last communication 1238, a total traffic with server 1240. The IP 1226 may indicate the IP address identifying the asset on the network. The hostname 1228 may correspond to the human-readable name assigned to the device. The device types 1230 may categorize the hardware, such as servers, routers, or workstations. The vendor 1232 may indicate the manufacturer or provider of the device. The OS 1234 may correspond to the operating system running on the asset. The asset risk score 1236 may indicate the vulnerability or threat level of the device. The last communication 1238 may indicate the most recent interaction with the one or more DNS servers 106. The total traffic with server 1240 may indicate the measured data exchanged between the asset and the one or more DNS servers 106. In one example embodiment, the associated assets 1216 may comprise "172.31.27.226" as the IP 1226, "ip-172-31-27-226.eu-central-1.compute.internal" as the hostname 1228, "workstation" as the device type 1230, VWX, Inc." as the vendor 1232, "OS1" as the OS 1234, "100" as the asset risk score 1236, "Apr. 27, 2021|09:35" as the last communication 1238, and "35.2 MB" as the total traffic with server 1240.

FIGS. 13A-13B illustrate a UI 1300, 1320 showing an IP range classification configuration within the settings 824, in accordance with an example embodiment of the present disclosure. FIGS. 13A-13B are described in conjunction with FIGS. 1-12.

In some embodiments, the UI 1300 may comprise the settings 824 showing the IP range classification configuration. The IP range classification configuration may comprise data associated with the one or more DNS servers 106 in the baseline database 312. In some embodiments, the data associated with the one or more DNS servers 106 may comprise an IP 1302, a hostname 1304, a network area 1306, "in baseline" 1308, an user update 1310, a first seen 1312, a last seen 1314. The IP 1302 may identify the location of the one or more DNS servers 106 on the network 102. The hostname 1304 may represent human-readable identifier of the one or more DNS servers 106. The network area 1306 may define the specific segment of the network the one or more DNS servers 106 belongs to. The 'in baseline' 1308 may indicate whether the DNS server data is part of the baseline database 312. The 'user update' 1310 may correspond to any modifications made by the one or more users. The 'first seen' 1312 and the 'last seen' 1314 may timestamps record when the DNS server data was initially detected and most recently observed, respectively. The UI 1300 may provide a "Remove from baseline" button 1316 to remove the DNS server from the baseline database 312. Further, each of the one or more DNS servers may be expanded using a "+" button 1318 to show information about each DNS server.

In one example, the one or more DNS servers may comprise "1.1.1.1" as the IP 1302, no hostname 1304, "internet" as the network area 1306, a symbol indicating that the "1.1.1.1" is a part of the baseline database 312, "Jan. 29, 2024 16:22: . . . " as the first seen 1312, and "Jan. 31, 2024 14:49: . . . " as the last seen 1314. In another example embodiment, the one or more DNS servers may comprise "8.8.8.8" as the IP 1302, "dns.bcd" as the hostname 1304, "internet" as the network area 1306, the symbol indicating that the "8.8.8.8" is a part of the baseline database 312, "Jan. 29, 2024 16:16: . . . " as the first seen 1312, and "Jan. 31, 2024 14:54: . . . " as the last seen 1314.

In yet another example, the one or more DNS servers may comprise "172.16.0.1" as the IP 1302, the symbol indicating that the "172.16.0.1" is a part of the baseline database 312, "Jan. 29, 2024 17:50: . . . " as the first seen 1312, and "Jan. 31, 2024 11:45: . . . " as the last seen 1314. In another example embodiment, the one or more DNS servers may comprise "172.20.10.1" as the IP 1302, the symbol indicating that the "172.20.10.1" is a part of the baseline database 312, "Jan. 31, 2024 10:50: . . . " as the first seen 1312, and "Jan. 31, 2024 10:50: . . . " as the last seen 1314.

In yet another example, the one or more DNS servers may comprise "192.168.0.102" as the IP 1302, "scadadns" as the hostname 1304, "internal" as the network area 1306, the symbol indicating that the "192.168.0.102" is a part of the baseline database 312, "Jan. 29, 2024 16:16: . . . " as the first seen 1312, and "Jan. 31, 2024 14:55: . . . " as the last seen 1314. In another example embodiment, the one or more DNS servers may comprise "192.168.1.124" as the IP 1302, the symbol indicating that the "192.168.1.124" is a part of the baseline database 312, "Jan. 29, 2024 18:15: . . . " as the first seen 1312, and "Jan. 29, 2024 18:15: . . . " as the last seen 1314.

In yet another example, the one or more DNS servers may comprise "192.168.68.1" as the IP 1302, the symbol indicating that the "192.168.68.1" is a part of the baseline database 312, "Jan. 29, 2024 17:04: . . . " as the first seen 1312, and "Jan. 31, 2024 13:06: . . . " as the last seen 1314. In another example embodiment, the one or more DNS servers 106 may comprise "213.57.2.5" as the IP 1302, "internet" as the network area 1306, the symbol indicating that the "213.57.2.5" is a part of the baseline database 312, "Jan. 29, 2024 16:16: . . . " as the first seen 1312, and "Jan. 31, 2024 14:50: . . . " as the last seen 1314.

As described in FIG. 13A, each of the one or more DNS servers 106 may be expanded using the "+" button 1318 to show information about each DNS server. The UI 1320 may represent a DNS server expanded in the IP range classification configuration. In one example embodiment, the IP "8.8.8.8" may be expanded. The expanded IP "8.8.8.8" may comprise other IP 1322, a hostname 1324, a MAC 1326, a vendor 1328, device types 1330, an operating system (OS) 1332, a last seen 1334, a total traffic 1336.

In one example, "192.168.1.132' as the other IP 1322, "00:50:56:BE:D9:51" as the MAC 1326, "VWX, INC." as the vendor 1328, "Workstation" as the device type 1330, "OS2" as the OS 1332, "Jan. 12, 2024 11:19: . . . " as the last seen 1334. In another example embodiment, "192.168.1.254' as the other IP 1322, "00:50:56:85:CE:F4" as the MAC, 1326 "VWX, INC." as the vendor 1328, "Workstation" as the device type 1330, "OS3" as the OS 1332, "Jan. 30, 2024 11:18: . . . " as the last seen 1334. In yet another example embodiment, "192.168.1.43' as the other IP 1322, "eliram-pc" as the hostname 1324, "00:50:56:85:3A:ED" as the MAC 1326, "VWX, INC." as the vendor 1328, "HMI" as the device type 1330, "OS4" as the OS 1332, "Jan. 30, 2024 11:18: . . . " as the last seen 1334. In one example embodiment, "192.168.2.34" as the other IP 1322, "alertonvm" as the hostname 1324, "00:50:56:85:28:7C" as the MAC 1326, "VWX, INC." as the vendor 1328, "Workstation, SQL" as the device type 1330, "OS5" as the OS 1332, "Jan. 30, 2024 11:19: . . . " as the last seen 1334.

FIG. 14 illustrates a block diagram 1400 involving one or more users and the one or more DNS servers 106, in accordance with an example embodiment of the present disclosure. FIG. 14 is described in conjunction with FIGS. 1-13.

In some embodiments, the DNS flow may comprise a user 1402, the one or more DNS servers 106 having a recursive DNS server 1404 and an authoritative DNS server 1406, and a webpage 1408. The recursive DNS server 1404 may act as an intermediary between the user 1402 and the authoritative DNS server 1406. The authoritative DNS server 1406 may hold the actual DNS records for specific domains and provides the definitive answers to queries about the specific domains, without needing to refer to other DNS servers. Further, the recursive DNS server 1406 may be configured to handle the process of finding the right authoritative server and returning the information to the user 1402, the authoritative DNS server 1406 may store and supply the DNS records themselves.

In some embodiments, when the user 1402 types a domain name into a web browser, the process of resolving the domain name to display the webpage 1408 may begin. The first step may involve the user's device checking the device's own DNS cache to see if the device has a recently cached IP address for the domain name. If the IP address is found in the local cache, the browser may immediately use the IP address to request the webpage 1408, skipping further steps, which is the fastest scenario, ensuring minimal delay.

In some embodiments, if the IP address is not found in the local cache, the request may be forwarded to the recursive DNS server 1404, often provided by the user's Internet Service Provider (ISP). The recursive DNS server 1404 may check the recursive DNS server 1404 own cache for the IP address of the requested domain name. The recursive DNS server 104 may cache the results of previous queries to speed up the resolution process for future requests. If the IP address is present in the cache of the recursive DNS server 104, the IP address is returned to the user's device without further querying other servers.

In some embodiments, when the recursive DNS server 104 may return the cached IP address to the user's device, the browser receives this information of IP address and uses the information to establish a connection with the web server hosting the webpage 1408. The browser may send an HTTP or HTTPS request to the web server's IP address, asking for the specific content of the webpage 1408. The web server may process the request and send back the HTML, CSS, JavaScript, images, and other resources required to display the webpage 1408 correctly.

In some embodiments, the browser may then begin rendering the webpage 1408, using the received resources to construct and display the final page that the user sees. During the rendering process, the browser may also make additional DNS requests if the webpage 1408 includes resources hosted on different domains, repeating the process of checking the cache and resolving IP addresses. As a result, the webpage 1408 may be displayed to the user.

Therefore, when the user 1402 types a domain name, if the IP address is cached either locally or in the recursive DNS server 1404, the resolution process may be significantly expedited. The caching may reduce the need for repeated queries to the authoritative DNS server 1406, thereby decreasing the time taken to load the webpage 1408 and improving the overall user experience. By leveraging cached IP addresses, the DNS resolution process may become more efficient, minimizing the latency involved in connecting to web servers and retrieving content of the webpage 1408.

FIG. 15 illustrates a flowchart showing a method 1500 for detecting anomalies within the DNS traffic, in accordance with an example embodiment of the present disclosure. FIG. 15 is described in conjunction with FIGS. 1-14.

At operation 1502, the at least one processor 202 may be configured to receive the DNS traffic data from each of the one or more DNS servers 106 in real time. The DNS traffic data may comprise the DNS queries and responses, the IP address of each of the one or more DNS servers 106, the first seen date when each of the one or more DNS servers 106 was first observed, the last seen date when each of the one or more DNS servers 106 was last observed, the baseline information of each of the one or more DNS servers 106, or the one or more client IP addresses interacted with each of the one or more DNS servers 106.

For example, a financial institution operates a network with multiple DNS servers to handle the resolution of domain names. The institution deploys the at least one processor 202 configured to receive real-time DNS traffic data from the multiple DNS servers. The DNS traffic data includes queries made to resolve domain names, the IP addresses of the DNS servers handling the queries, first seen date i.e., the first time a particular DNS server was observed, last seen date i.e., the most recent time the DNS server was active, baseline information indicating whether the DNS server is part of the baseline (normal behavior), and IP addresses of clients interacting with the DNS server. For instance, a DNS server 192.168.1.1 handled a query to resolve "example.com" from client 192.168.2.10, first seen on Jun. 1, 2024, and last seen on Jun. 5, 2024.

At operation 1504, the at least one processor 202 may be configured to compare the received DNS traffic data from each of the one or more DNS servers 106 with the data stored in the database 302. The data may correspond to the historical DNS traffic data related to the one or more known DNS servers stored in the database 302 during the predefined learning period. In some embodiments, the historical DNS traffic data may comprise the DNS raw data 306 and the DNS servers data 308. The DNS raw data 306 may comprise the one or more DNS queries and the one or more DNS responses. The one or more DNS responses may comprise the list of questions that are answered by the one or more DNS servers 106 based at least on the one or more DNS queries. In some embodiments, the predefined learning period may correspond to the predefined time period during which the at least one processor 202 is configured to process and store statistics based on the DNS traffic data into the database 302. In one example embodiment, the predefined learning period may comprise at least one of hours, days, months, quarters, or years.

For example, the at least one processor 202 compares this real-time data with historical DNS traffic data stored in the database 302. The historical DNS traffic data was gathered during a predefined learning period using the sniffer 304, which captured DNS raw data 306 and DNS server data, and stored them in the database 302. For example, during the learning period (Jun. 1-3, 2024), the sniffer 304 recorded DNS traffic, including queries to "example.com" and responses from server 192.168.1.1.

At operation 1506, the at least one processor 202 may be configured to determine the status of each of the one or more DNS servers 106 based at least on the comparison. The status may correspond to the detection of the one or more DNS servers 106 within the predefined learning period or the detection of the one or more DNS servers 106 outside the predefined learning period. For example, upon comparing the new DNS traffic data with the historical DNS traffic data, the at least one processor 202 determines the status of each DNS server. If the new DNS server aligns with what's stored in the database 302, the new DNS server is marked as "learning." If the new DNS server doesn't match, the new DNS server is marked as "outside of the learning period." For instance, if server 192.168.1.1 shows consistent activity since June 1, it is labeled "learning." If a new server 192.168.1.2 appears, it's labeled "outside of the learning period."

At operation 1508, the at least one processor 202 may be configured to generate the alert for one or more users upon determining the one or more DNS servers 106 outside the predefined learning period based at least on the determined status. For example, the at least one processor 202 generates an alert if any DNS server is outside the predefined learning period. For example, if server 192.168.1.2 is not found in the historical DNS traffic data or outside the predefined learning period, an alert is sent to the network administrators.

At operation 1510, the at least one processor 202 may be configured to determine whether each of the one or more DNS servers 106 outside the predefined learning period is queried by the one or more DNS hosts 402. For example, the at least one processor 202 checks if these new DNS servers (e.g., 192.168.1.2) are being queried by clients. At operation 1512, the at least one processor 202 may be configured to add each of the one or more DNS servers 106 to the baseline database 312 upon determining that each of the one or more DNS servers 106 outside the predefined learning period is queried by the one or more DNS hosts 402. In some embodiments, the baseline database 312 may comprise the one or more baseline parameters. The one or more baseline parameters may comprise at least one of the learning mode indicating if the database 302 is currently in the predefined learning period, the cumulative learning time spent in the predefined learning period, the last queried date when the baseline database 312 was queried or updated, the last start time when the predefined learning period was started for the baseline database 312, and the type or the category of the baseline.

For example, if the new DNS server 192.168.1.2 is being queried by clients, the new DNS server is added to the baseline database 312, indicating it is now part of the network's normal behavior. For instance, if client 192.168.2.20 queries server 192.168.1.2, the server is added to the baseline with metadata such as the learning mode status, cumulative learning time, last queried date, and baseline type.

In some embodiments, the method may further comprise generating, via the at least one processor 202, the union of the one or more DNS servers 106 and the one or more known DNS servers, upon determining that the one or more DNS servers 106 are within the predefined learning period. Further, the method may comprise determining, via the at least one processor 202, the another one or more DNS servers 106 within the union generated. Furthermore, the method may comprise determining, via the at least one processor 202, whether one or more parameters of the another one or more DNS servers 106 within the union are newer than one or more parameters of the one or more known DNS servers upon determining the another one or more DNS servers 106 are within the union. The one or more parameters of the another one or more DNS servers 106 and the one or more parameters of the one or more known DNS servers may comprise at least last seen date. Thereafter, the method may comprise updating, via the at least one processor 202, the one or more parameters of the another one or more DNS servers 106 within the database 302 upon determining the one or more parameters of the another one or more DNS servers 106 within the union are newer than one or more parameters of the one or more known DNS servers. For example, if the union reveals that server 192.168.1.3 is newer and active, it's added to the database 302. If it shows that server 192.168.1.1 is older and inactive, it's removed.

In some embodiments, the method may further comprise determining, via the at least one processor 202, the one or more parameters of the another one or more DNS servers 106 are older than the predefined period. The predefined period may correspond to the forgetting period that corresponds to the time period after which the at least one processor 202 is configured to remove the another one or more DNS servers 106 from the database 302. Thereafter, the method may comprise removing, via the at least one processor 202, the data associated with each of the another one or more DNS servers 106 upon determining the one or more parameters of the another one or more DNS servers 106 are older than the predefined period. For example, if server 192.168.1.1 hasn't been active for 30 days (the forgetting period), it is removed from the database 302.

In some embodiments, the method may further comprise displaying, via the at least one processor 202, the alert on the display device of the one or more users. The alert may comprise at least one of the alert type, the description of alert, and the resolution of the alert. In one example embodiment, the alert type may comprise the active servers or the inactive servers. For example, the at least one processor 202 displays the alert for network administrators over a user interface of a display device. The alert type is "Warning," categorizing the nature of the alert to indicate potential issues that need attention. The description details that DNS server 192.168.1.2, which first appeared on Jun. 5, 2024, is not found in the historical DNS traffic data, indicating it is "outside of the learning period." This new server was queried by client 192.168.2.20. The resolution advises administrators to verify the legitimacy of DNS server 192.168.1.2 by checking recent network changes or consulting with the IT security team. If verified as legitimate, administrators should manually add this server to the baseline database 312 to update the network's normal behavior patterns, ensuring the system recognizes it as part of the normal operations and enhancing the accuracy of future anomaly detection.

By following the method 1500, the financial institution's network may automatically learn and adapt to the DNS traffic pattern, that enhances the accuracy of anomaly detection, ensuring that any unusual or potentially malicious activity is quickly identified and addressed.

In an exemplary embodiment, a non-transitory machine-readable information storage medium is disclosed. The non-transitory machine-readable information storage medium comprising one or more instructions which when executed by at least one processor 202 may cause the at least one processor 202 to receive the DNS traffic data from each of the one or more DNS servers 106 in real time. In some embodiments, the DNS traffic data may comprise the DNS queries and responses, the IP address of each of the one or more DNS servers 106, the first seen date when each of the one or more DNS servers 106 was first observed, the last seen date when each of the one or more DNS servers 106 was last observed, the baseline information of each of the one or more DNS servers 106, or the one or more client IP addresses interacted with each of the one or more DNS servers 106.

In some embodiments, the one or more instructions which when executed by at least one processor 202 may cause the at least one processor 202 to compare the received DNS traffic data from each of the one or more DNS servers 106 with the data stored in the database 302. The data may correspond to historical DNS traffic data related to the one or more known DNS servers stored in the database 302 during the predefined learning period. The historical DNS traffic data may comprise the DNS raw data 306 and the DNS servers data 308. The DNS raw data 306 may comprise the one or more DNS queries and the one or more DNS responses. The one or more DNS responses may comprise the list of questions that are answered by the one or more DNS servers 106 based at least on the one or more DNS queries.

In some embodiments, the one or more instructions which when executed by at least one processor 202 may cause the at least one processor 202 to determine the status of each of the one or more DNS servers 106 based at least on the comparison. The status may correspond to the detection of the one or more DNS servers 106 within the predefined learning period or the detection of the one or more DNS servers 106 outside the predefined learning period. Further, the one or more instructions which when executed by at least one processor 202 may cause the at least one processor 202 to generate the alert for the one or more users. The alert may be generated upon determining the one or more DNS servers 106 outside the predefined learning period, based at least on the determined status. Furthermore, the one or more instructions which when executed by at least one processor 202 may cause the at least one processor 202 to determine whether each of the one or more DNS servers 106 outside the predefined learning period is queried by the one or more DNS hosts 402. Thereafter, the one or more instructions which when executed by at least one processor 202 may cause the at least one processor 202 to add each of the one or more DNS servers 106 to the baseline database 312. Each of the one or more DNS servers 106 may be added to the baseline database 312 upon determining that each of the one or more DNS servers 106 outside the predefined learning period is queried by the one or more DNS hosts 402.

In some embodiments, the at least one processor 202 may be configured to display the alert on the display device of the one or more users. The alert may comprise at least one of the alert type, the description of the alert, and the resolution of the alert. In one example embodiment, the alert type may comprise the active severs or the inactive servers.

The present disclosure may provide a real-time analysis of DNS traffic data, enhancing the accuracy and timeliness of DNS server detection. By leveraging at least one processor, the system may efficiently receive and process DNS queries and responses along with the associated IP addresses of DNS servers. The system may track critical timestamps such as the first and last seen dates for each server, providing a comprehensive historical context of the DNS servers. The system's ability to compare real-time DNS traffic data with historical DNS traffic data may allow for precise identification of DNS servers, distinguishing between the DNS servers observed during and outside a predefined learning period. The comparison may facilitate the generation of timely alerts, enabling one or more users to respond promptly to potential anomalies.

Additionally, the system may identify DNS servers queried by hosts, ensuring that even newly observed DNS servers are quickly integrated into the baseline database, thereby maintaining up-to-date network profiles. The continuous learning and adaptation process provided by the system may significantly improve the robustness of network security. Furthermore, the automation of the above processes may reduce the need for manual monitoring, freeing up resources for other critical tasks. The enhanced detection capabilities may further aid in identifying malicious activities early, thereby mitigating potential security threats. The system may learn and adjust to the typical behavior of each network's DNS traffic. Enhancement in the precision and efficacy of anomaly detection not only mitigates the false harmless actions but may also protect network security by promptly identifying and thwarting potential cyber security threats within the DNS traffic. Overall, the present disclosure may contribute to a more secure and efficient DNS traffic management system.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:

receiving, via at least one processor, domain name system (DNS) traffic data from each of one or more DNS servers in real time, wherein the DNS traffic data comprises DNS queries and responses, internet protocol (IP) address of each of the one or more DNS servers, first seen date when each of the one or more DNS servers was first observed, last seen date when each of the one or more DNS servers was last observed, baseline information of each of the one or more DNS servers, or one or more client IP addresses interacted with each of the one or more DNS servers;

comparing, via the at least one processor, the received DNS traffic data from each of the one or more DNS servers with a data stored in a database, wherein the data corresponds to historical DNS traffic data related to one or more known DNS servers stored in the database during a predefined learning period;

determining, via the at least one processor, a status of each of the one or more DNS servers based at least on the comparison, wherein the status corresponds to a detection of the one or more DNS servers within the predefined learning period or the detection of the one or more DNS servers outside the predefined learning period;

generating, via the at least one processor, an alert for one or more users upon determining the one or more DNS servers outside the predefined learning period based at least on the determined status;

determining, via the at least one processor, whether each of the one or more DNS servers outside the predefined learning period is queried by one or more DNS hosts; and adding, via the at least one processor, each of the one or more DNS servers to a baseline database upon determining that each of the one or more DNS servers outside the predefined learning period is queried by the one or more DNS hosts.

2. The method of claim 1, wherein the historical DNS traffic data comprises DNS raw data and DNS servers data, wherein the DNS raw data comprises one or more DNS queries and one or more DNS responses, and wherein the one or more DNS responses comprises a list of questions that are answered by the one or more DNS servers based at least on the one or more DNS queries.

3. The method of claim 1, wherein the predefined learning period corresponds to a predefined timeframe during which the at least one processor is configured to process and store statistics based on the DNS traffic data into the database, and wherein the predefined learning period comprises at least one of hours, days, months, quarters, or years.

4. The method of claim 1, wherein the baseline database comprises one or more baseline parameters, wherein the one or more baseline parameters comprises at least one of learning mode indicating if the database is currently in the predefined learning period, cumulative learning time spent in the predefined learning period, last queried date when the baseline database was queried or updated, last start time when the predefined learning period was started for the baseline database, and a type or a category of a baseline.

5. The method of claim 1 further comprising generating, via the at least one processor, a union of the one or more DNS servers and the one or more known DNS servers, upon determining that the one or more DNS servers are within the predefined learning period.

6. The method of claim 5 further comprising:

determining, via the at least one processor, another one or more DNS servers within the union generated;

determining, via the at least one processor, whether one or more parameters of the another one or more DNS servers within the union are newer than one or more parameters of the one or more known DNS servers upon determining the another one or more DNS servers are within the union, wherein the one or more parameters of the another one or more DNS servers and the one or more parameters of the one or more known DNS servers comprise at least last seen date; and updating, via the at least one processor, the one or more parameters of the another one or more DNS servers within the database upon determining the one or more parameters of the another one or more DNS servers within the union are newer than one or more parameters of the one or more known DNS servers.

7. The method of claim 6 further comprising determining, via the at least one processor, the one or more parameters of the another one or more DNS servers are older than a predefined period, wherein the predefined period corresponds to a forgetting period that corresponds to a time period after which the at least one processor is configured to remove the another one or more DNS servers from the database.

8. The method of claim 7 further comprising removing, via the at least one processor, a data associated with each of the another one or more DNS servers upon determining the one or more parameters of the another one or more DNS servers are older than the predefined period.

9. The method of claim 1 further comprising displaying, via the at least one processor, the alert on a display device of the one or more users, wherein the alert comprises at least one of alert type that comprises active servers or inactive servers, description of alert, and resolution of the alert.

10. A system comprising:

a memory; and at least one processor communicatively coupled to the memory, wherein the at least one processor is configured to:

receive domain name system (DNS) traffic data from each of one or more DNS servers in real time, wherein the DNS traffic data comprises DNS queries and responses, internet protocol (IP) address of each of the one or more DNS servers, first seen date when each of the one or more DNS servers was first observed, last seen date when each of the one or more DNS servers was last observed, baseline information of each of the one or more DNS servers, or one or more client IP addresses interacted with each of the one or more DNS servers;

compare the received DNS traffic data from each of the one or more DNS servers with a data stored in a database, wherein the data corresponds to historical DNS traffic data related to one or more known DNS servers stored in the database during a predefined learning period;

determine a status of each of the one or more DNS servers based at least on the comparison, wherein the status corresponds to a detection of the one or more DNS servers within the predefined learning period or the detection of the one or more DNS servers outside the predefined learning period;

generate an alert for one or more users upon determining the one or more DNS servers outside the predefined learning period based at least on the determined status;

determine whether each of the one or more DNS servers outside the predefined learning period is queried by one or more DNS hosts; and add each of the one or more DNS servers to a baseline database upon determining that each of the one or more DNS servers outside the predefined learning period is queried by the one or more DNS hosts.

11. The system of claim 10, wherein the historical DNS traffic data comprises DNS raw data and DNS servers data, wherein the DNS raw data comprises one or more DNS queries and one or more DNS responses, and wherein the one or more DNS responses comprises a list of questions that are answered by the one or more DNS servers based at least on the one or more DNS queries.

12. The system of claim 10, wherein the predefined learning period corresponds to a predefined timeframe during which the at least one processor is configured to process and store statistics based on the DNS traffic data into the database, and wherein the predefined learning period comprises at least one of hours, days, months, quarters, or years.

13. The system of claim 10, wherein the baseline database comprises one or more baseline parameters, wherein the one or more baseline parameters comprises at least one of learning mode indicating if the database is currently in the predefined learning period, cumulative learning time spent in the predefined learning period, last queried date when the baseline database was queried or updated, last start time when the predefined learning period was started for the baseline database, and a type or a category of a baseline.

14. The system of claim 10, wherein the at least one processor is configured to generate a union of the one or more DNS servers and the one or more known DNS servers, upon determining that the one or more DNS servers are within the predefined learning period.

15. The system of claim 14, wherein the at least one processor is further configured to:

determine another one or more DNS servers within the union generated;

determine whether one or more parameters of the another one or more DNS servers within the union are newer than one or more parameters of the one or more known DNS servers upon determining the another one or more DNS servers are within the union, wherein the one or more parameters of the another one or more DNS servers and the one or more parameters of the one or more known DNS servers comprise at least last seen date; and update the one or more parameters of the another one or more DNS server within the database upon determining the one or more parameters of the another one or more DNS servers within the union are newer than one or more parameters of the one or more known DNS servers.

16. The system of claim 15, wherein the at least one processor is further configured to:

determine the one or more parameters of the another one or more DNS servers are older than a predefined period, wherein the predefined period corresponds to a forgetting period that corresponds to a time period after which the at least one processor is configured to remove the another one or more DNS servers from the database; and remove a data associated with each of the another one or more DNS servers upon determining the one or more parameters of the another one or more DNS servers are older than the predefined period.

17. The system of claim 10, wherein the at least one processor is configured to display the alert on a display device of the one or more users, wherein the alert comprises at least one of alert type that comprises active severs or inactive servers, description of alert, and resolution of the alert.

18. A non-transitory machine-readable information storage medium comprising one or more instructions which when executed by at least one processor cause the at least one processor to:

receive domain name system (DNS) traffic data from each of one or more DNS servers in real time, wherein the DNS traffic data comprises DNS queries and responses, internet protocol (IP) address of each of the one or more DNS servers, first seen date when each of the one or more DNS servers was first observed, last seen date when each of the one or more DNS servers was last observed, baseline information of each of the one or more DNS servers, or one or more client IP addresses interacted with each of the one or more DNS servers;

compare the received DNS traffic data from each of the one or more DNS servers with a data stored in a database, wherein the data corresponds to historical DNS traffic data related to one or more known DNS servers stored in the database during a predefined learning period;

determine a status of each of the one or more DNS servers based at least on the comparison, wherein the status corresponds to a detection of the one or more DNS servers within the predefined learning period or the detection of the one or more DNS servers outside the predefined learning period;

generate an alert for one or more users upon determining the one or more DNS servers outside the predefined learning period based at least on the determined status;

determine whether each of the one or more DNS servers outside the predefined learning period is queried by one or more DNS hosts; and add each of the one or more DNS servers to a baseline database upon determining that each of the one or more DNS servers outside the predefined learning period is queried by the one or more DNS hosts.

19. The non-transitory machine-readable information storage medium of claim 18, wherein the historical DNS traffic data comprises DNS raw data and DNS servers data, wherein the DNS raw data comprises one or more DNS queries and one or more DNS responses, and wherein the one or more DNS responses comprises a list of questions that are answered by the one or more DNS servers based at least on the one or more DNS queries.

20. The non-transitory machine-readable information storage medium of claim 18, wherein the at least one processor is configured to display the alert on a display device of the one or more users, wherein the alert comprises at least one of alert type that comprises active severs or inactive servers, description of alert, and resolution of the alert.

* * * * *